United States Patent
Liu et al.

(10) Patent No.: US 11,407,322 B2
(45) Date of Patent: Aug. 9, 2022

(54) SMART POWER HUB

(71) Applicant: Hong Kong Applied Science and Technology Research Institute Company, Limited, Hong Kong (HK)

(72) Inventors: Xuechao Liu, Hong Kong (HK); Kin Lap Wong, Hong Kong (HK); Qingchun Li, Shenzhen (CN); Bin Xie, Hong Kong (HK); Danting Xu, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 490 days.

(21) Appl. No.: 16/561,274

(22) Filed: Sep. 5, 2019

(65) Prior Publication Data

US 2021/0070185 A1 Mar. 11, 2021

(51) Int. Cl.
*B60L 53/22* (2019.01)
*B60L 53/51* (2019.01)
*B60L 53/14* (2019.01)

(52) U.S. Cl.
CPC ............ *B60L 53/22* (2019.02); *B60L 53/14* (2019.02); *B60L 53/51* (2019.02);
(Continued)

(58) Field of Classification Search
CPC .......... B60L 53/14; B60L 53/22; B60L 53/51; B60L 2210/46; Y02T 10/70; Y02T 10/72; Y02T 10/7072; Y02T 90/12; Y02T 90/14
See application file for complete search history.

(56) References Cited

U.S. PATENT DOCUMENTS 7,564,702 B2 7/2009 Schlecht
RE45,069 E 8/2014 Falk
(Continued)

FOREIGN PATENT DOCUMENTS

CN 106685041 A 5/2017
CN 106936184 A 7/2017
(Continued)

OTHER PUBLICATIONS

Xiaoyong Hu, Ziyang Gao, Zhou Li, Un-Published U.S. Appl. No. 16/219,982, filed Dec. 14, 2018.
ISR and Written Opinion, PCT/CN2019/105762, dated Jun. 5, 2020.

*Primary Examiner* — Richard Isla
*Assistant Examiner* — Johali A Torres Ruiz
(74) *Attorney, Agent, or Firm* — Stuart T. Auvinen; gPatent LLC

(57) ABSTRACT

A smart power hub has an AC port, a first DC port to a car battery, a second DC port to DC devices such as car instruments, and a third DC port to solar panels or another smart power hub. An AC bi-directional converter has six transistors in a B6 configuration to convert three-phase AC, acting as an interleaved totem-pole Power-Factor-Corrector for one-phase AC. A switch connects the DC bi-directional converter with either the AC bi-directional converter or the solar panels on the third DC port. A link capacitor has a DC link voltage that rises during battery charging. A DC bi-directional converter has a transformer, a primary bridge connected to the DC link voltage, and a secondary bridge of transistors connected to the first DC port. Auxiliary windings in the transformer drive a rectifier to the second DC port to power on-board DC devices. Solar DC charges the battery without AC conversion.

15 Claims, 27 Drawing Sheets

(52) U.S. Cl.
CPC ............ *B60L 2210/46* (2013.01); *Y02T 10/70* (2013.01); *Y02T 10/72* (2013.01); *Y02T 90/12* (2013.01); *Y02T 90/14* (2013.01)

(56) References Cited

U.S. PATENT DOCUMENTS

| | | | |
|---|---|---|---|
| 9,537,319 | B2 | 1/2017 | Parkhideh et al. |
| 9,704,819 | B1 | 7/2017 | Gao et al. |
| 9,729,066 | B1 | 8/2017 | Lu et al. |
| 9,931,951 | B2 | 4/2018 | Khaligh et al. |
| 10,003,254 | B2 | 6/2018 | Wang et al. |
| 10,014,280 | B2 | 7/2018 | Gao et al. |
| 2010/0157632 | A1* | 6/2010 | Batten ............... H02J 3/383 363/74 |
| 2012/0068663 | A1* | 3/2012 | Tanikawa ............ H02J 1/08 320/109 |
| 2016/0016479 | A1* | 1/2016 | Khaligh ............. H01F 38/08 336/170 |
| 2016/0118797 | A1* | 4/2016 | Balda Belzunegui .. H02J 9/062 307/26 |
| 2017/0110878 | A1* | 4/2017 | Jacobson ............. H02J 1/00 |
| 2017/0294833 | A1* | 10/2017 | Yang .................. H02M 1/4225 |
| 2018/0337532 | A1* | 11/2018 | Abu Qahouq ........... H02J 3/06 |
| 2019/0081506 | A1 | 3/2019 | Chang et al. |
| 2019/0217732 | A1 | 7/2019 | Zhou et al. |
| 2019/0237416 | A1 | 8/2019 | Gao et al. |
| 2020/0321796 | A1* | 10/2020 | Chang ................. H02J 7/1492 |
| 2021/0155100 | A1* | 5/2021 | Khaligh .............. H02M 7/797 |

FOREIGN PATENT DOCUMENTS

| | | |
|---|---|---|
| CN | 107627881 A | 1/2018 |
| CN | 207156960 U | 3/2018 |
| CN | 107867186 A | 4/2018 |
| CN | 107994777 A | 5/2018 |
| CN | 109703399 A | 5/2019 |
| KR | 20170078028 A | 7/2017 |

* cited by examiner

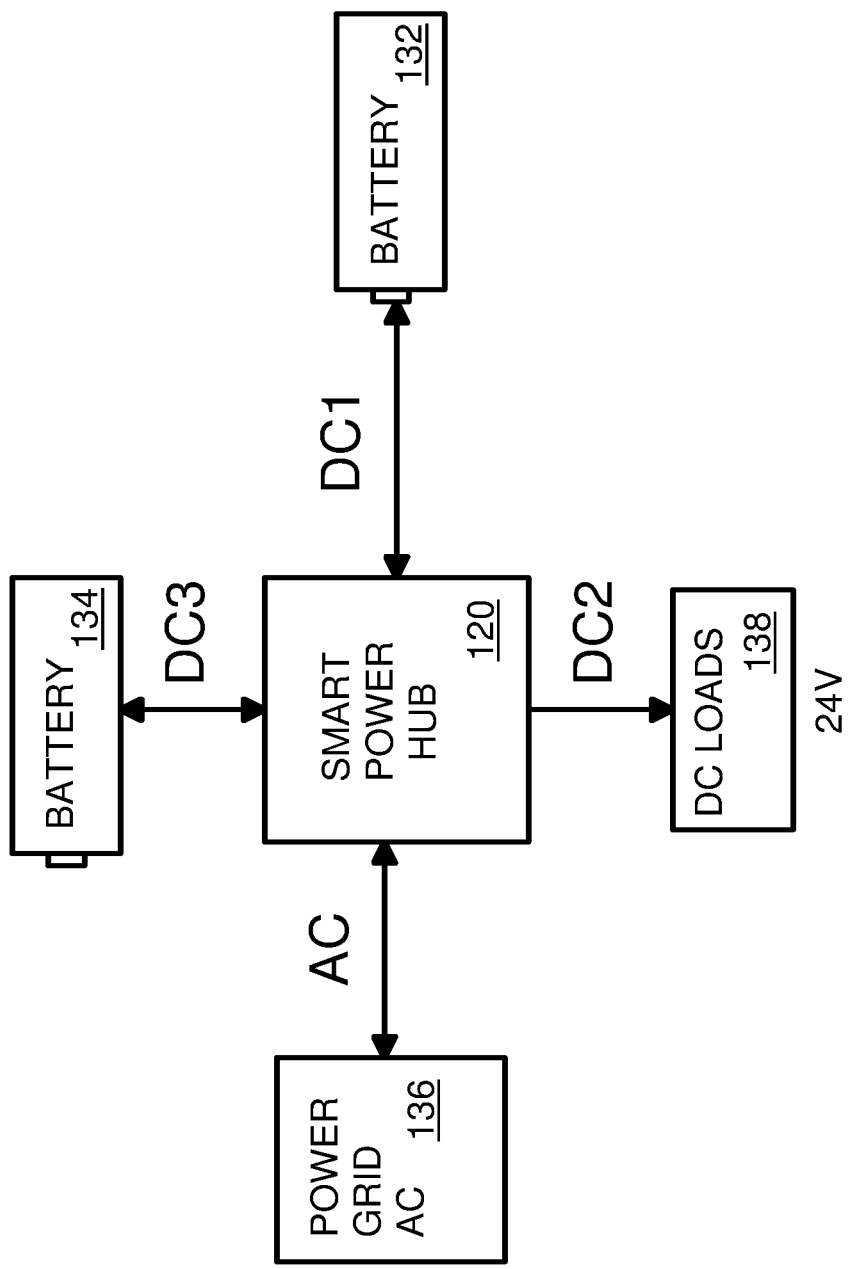

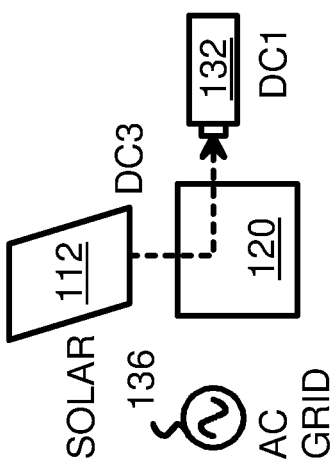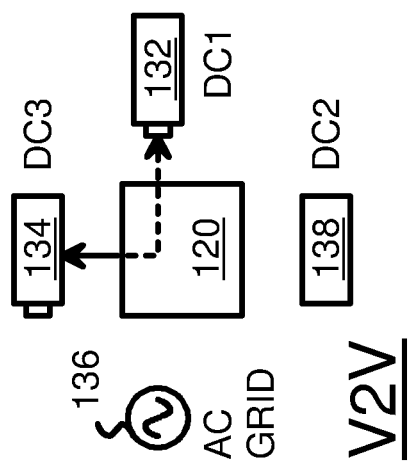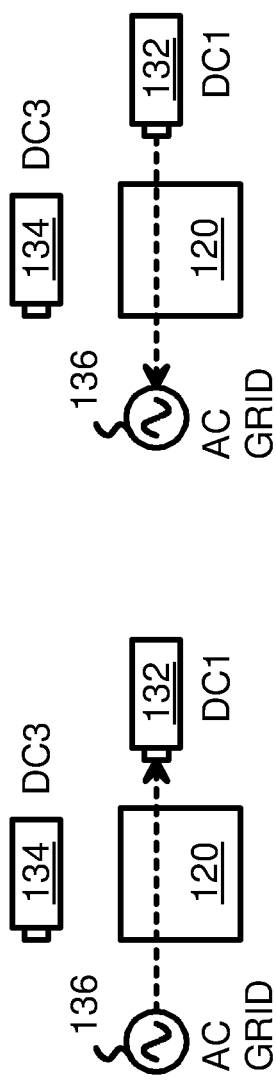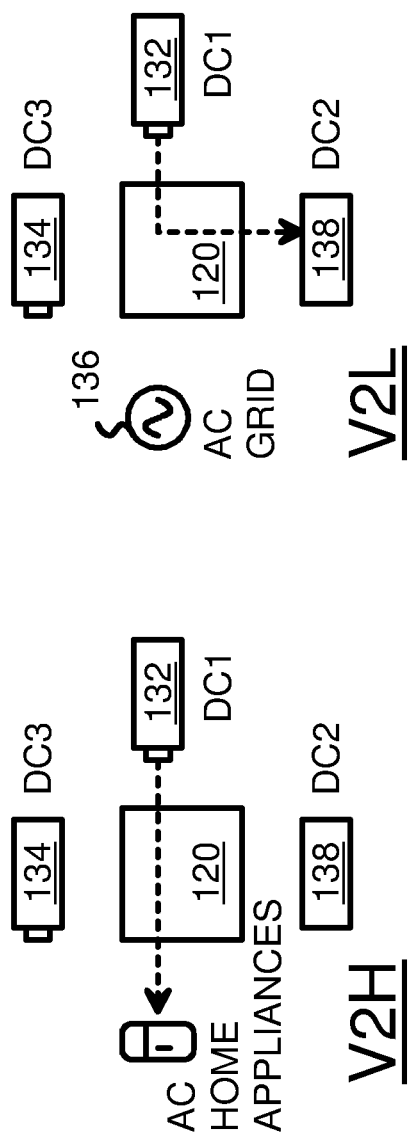

CHARGING MODE

THREE-PHASE AC MODE

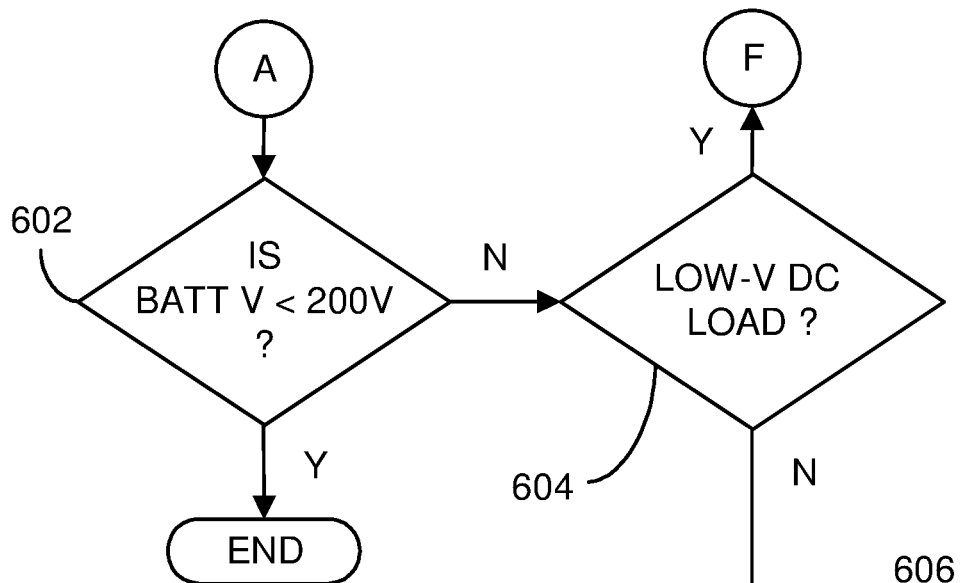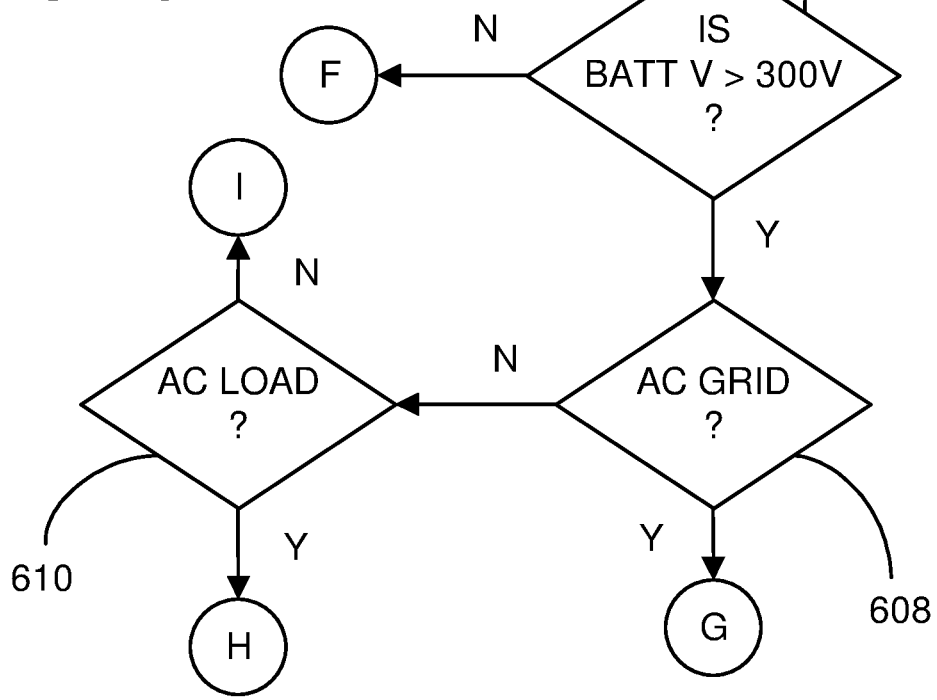
FIG. 19E

SMART POWER HUB

FIELD OF THE INVENTION

This invention relates to Electric Vehicles (EV's), and more particularly to intelligent hubs for charging and discharging EV's.

BACKGROUND OF THE INVENTION

Electric Vehicles (EV's) benefit the environment by eliminating tailpipe emissions. Greenhouse gas emissions such as $CO_2$ can be dramatically reduced when EV's are charged from clean energy sources such as hydroelectricity or solar. Smart electric grids may charge the EV's on-board battery during slack demand periods such as at night, while possibly discharging EV batteries to power the grid during demand surges, thus reducing the need to build new power plants to meet these demand surges.

FIG. 1 shows a prior-art EV. EV 100 is powered by battery 106, which can be a large Lithium ion battery that may have its own Battery Management System (BMS). Battery 106 may be directly connected to an electric engine that drives the wheels or drive train of EV 100 for propulsion. On-board DC/DC converter 108 converts the DC voltage from battery 106 to power on-board electronics and devices, such as heaters, instruments, radios, lights, and other auxiliary devices.

On-board charger 104 charges battery 106 from an external power source, such as a power cable plugged into AC plug 102. On-board charger 104 may have a higher power rating, such as 6.6 kW, compared to that for on-board charger 104, which may draw only 1 kW, allowing battery 106 to be rapidly charged when plugged in to AC plug 102. Battery 106 may also be charged by regenerative braking or by small solar panels on EV 100.

FIG. 2 shows an EV being charged from home solar panels. A homeowner may install solar panels 112 on the roof of his house to capture sunlight that generates a Direct Current (DC) in solar panels 112. The DC from solar panels 112 is converted to Alternating Current (AC) by DC-AC inverter 110 to power appliances on AC grid 114. Solar-generated electricity on AC grid 114 may flow onto the power utility's lines to power other customers, running the homeowner's utility meter backwards.

While such backward metering can lower the homeowner's utility bill, the utility may not credit the homeowner at the same rate as the electricity drawn from the utility. The homeowner would be better to use his own solar-generated electricity to charge his EV 100 battery 106.

Although solar panels 112 generated DC power, and EV 100 uses DC to power its engine and on-board devices, the solar power is first converted to AC by DC-AC inverter 110 to power AC grid 114, then AC power is sent through AC plug 102 and the EV cable to EV 100, where on-board charger 104 converts the AC back to DC to charge battery 106. Conversion from DC to AC and then back to DC introduces some losses due to inefficiencies in the power conversion circuits. It would be desirable to use the DC power from solar panels 112 to directly charge battery 106 in EV 100.

Having on-board DC/DC converter 108 separate from on-board charger 104 increases the number of components and the complexity of EV 100. On-board space could be reduced if on-board charger 104 were integrated with multi-view display on-board DC/DC converter 108.

Charging battery 106 may be slow when ordinary single-phase AC power is available on AC grid 114. Faster charging is desirable when 3-phase AC is available, such as from an EV charging station with a fast charger.

Sometimes the homeowner or a fleet operator may have multiple EV's. During a power outage he may wish to charge one EV from another EV's battery. A bi-directional on-board charger that can transfer charge from one EV to another EV is also desirable. Alternately, he may wish to power AC home appliances such as a refrigerator from the EV battery during the power outage.

A more intelligent connection between the AC power grid, home solar panels, the EV battery, and appliances and devices on-board EV 100 and in the home is desirable. An integrated on-board charger and on-board DC/DC converter is desired. An integrated on-board charger than can accept DC power from home solar panels without AC conversion is also desirable.

BRIEF DESCRIPTION OF THE DRAWINGS

FIG. 5 shows connections to a smart power hub.

FIGS. 6A-6F show modes of operation of the smart power hub.

FIGS. 19A-19I is a flowchart of mode selection and configuration of the smart power hub.

DETAILED DESCRIPTION

Figure 1:
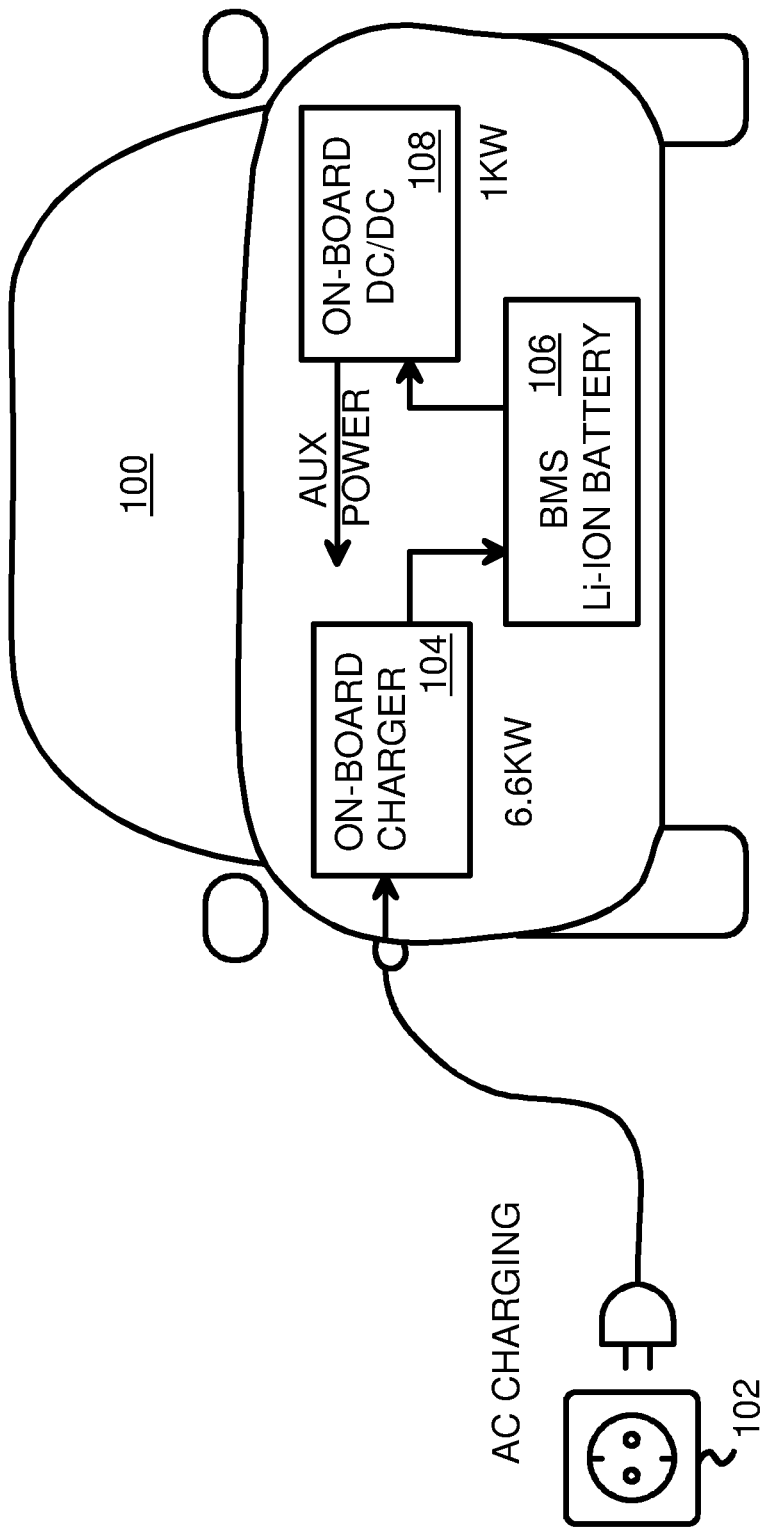
FIG. 1 shows a prior-art EV.
Figure 2:
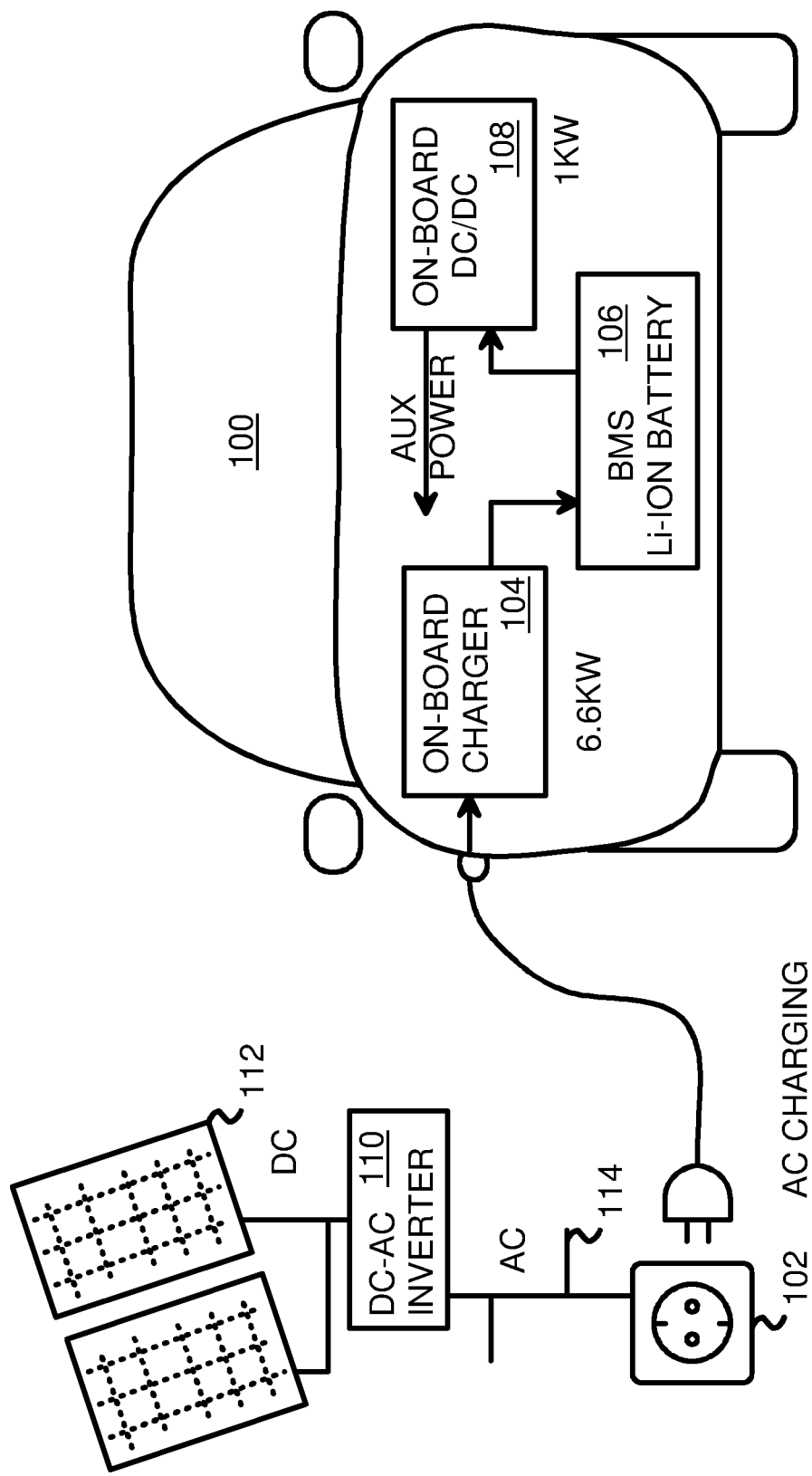
FIG. 2 shows an EV being charged from home solar panels.
Figure 3:
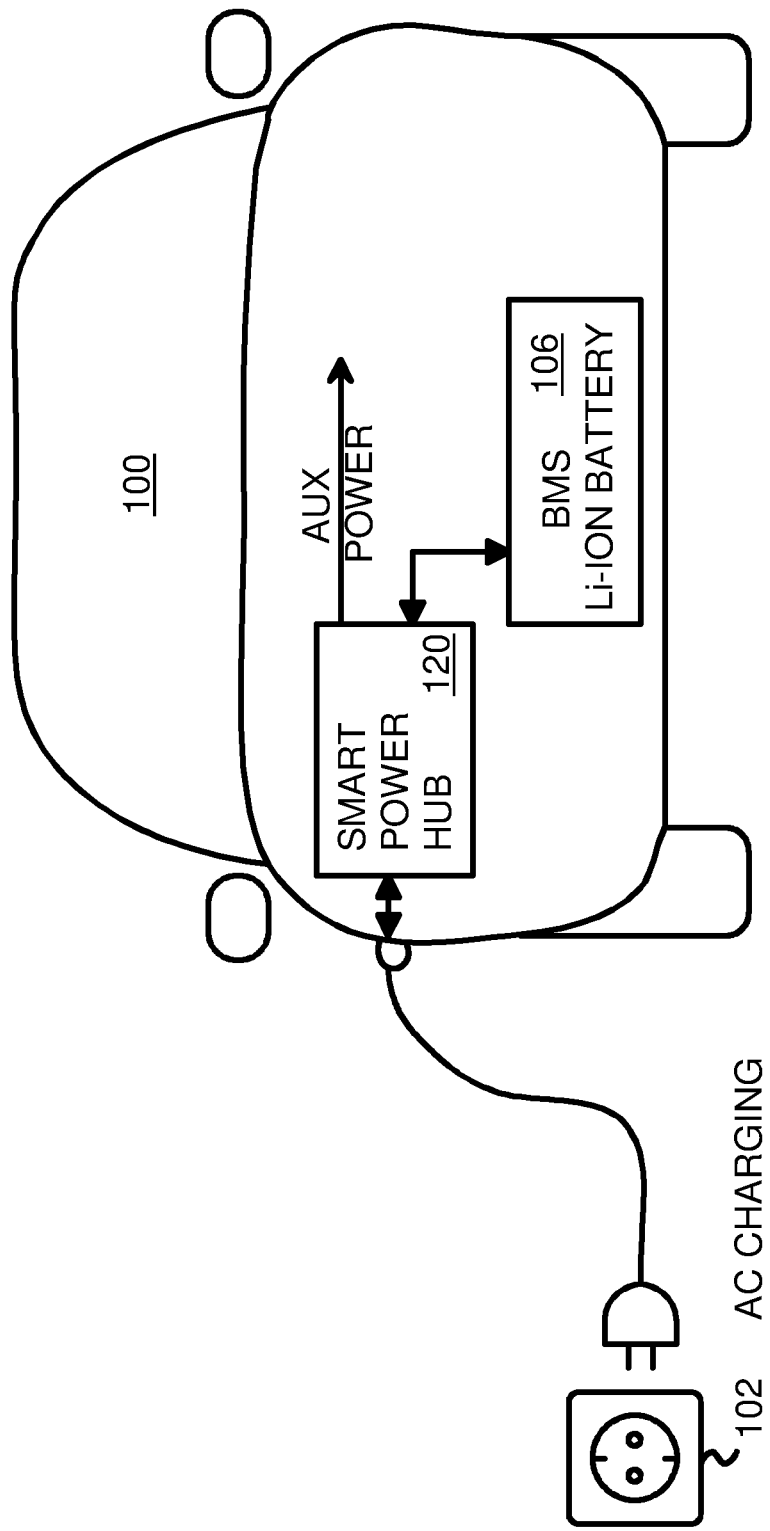
FIG. 3 shows an EV with a smart power hub.

The present invention relates to an improvement in EV on-board chargers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodi- FIG. 3 shows an EV with a smart power hub. Smart power hub 120 charges battery 106 from AC plug 102 and also generates DC power for on-board devices. Thus on-board charger 104 and on-board DC/DC converter 108 are replaced by smart power hub 120. Since smart power hub 120 may have a smaller form factor than the combination of on-board charger 104 and on-board DC/DC converter 108, space may be saved on EV 100. However, several other functions are provided by smart power hub 120.

Figure 4:
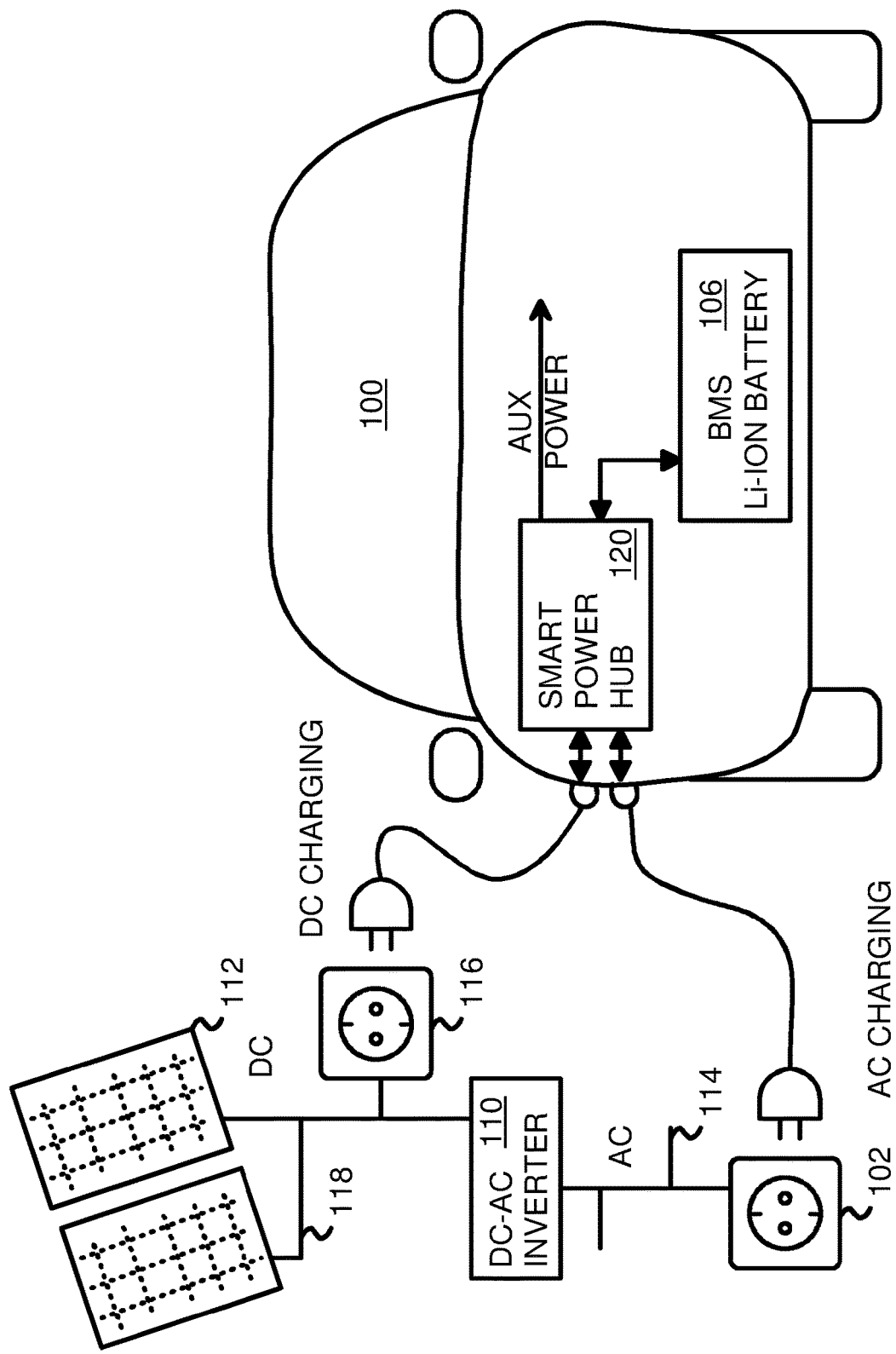
FIG. 4 shows an EV being charged directly from home solar panels without conversion to AC.

FIG. 4 shows an EV being charged directly from home solar panels without conversion to AC. Solar panels 112 generate DC power from sunlight using photovoltaic cells. This DC power generated by solar panels 112 is supplied to DC lines 118 to DC-AC inverter 110 that converts the solar DC to AC power on AC grid 114.

DC plug 116 is also connected to DC lines 118, allowing a DC cable to be plugged in to send the solar-generated DC power directly to smart power hub 120 on EV 100. This solar-generated DC power is passed through smart power hub 120 to charge battery 106 without conversion to AC. Efficiency is higher than if the solar power from solar panels 112 were first converted by DC-AC inverter 110 to AC, then sent through AC plug 102 to smart power hub 120 for conversion back to DC to charge battery 106. The peak efficiency may be above 98.5% when energy from DC plug 116 is converted directly through smart power hub 120.

DC-AC inverter 110 can be disabled when a DC cable from EV 100 is plugged into DC plug 116 and smart power hub 120 charges battery 106. When solar is not available, battery 106 can still be charged by smart power hub 120 from AC grid 114 and AC plug 102, but smart power hub 120 has to convert AC to DC in this mode. The homeowner has the flexibility to charge from solar or from AC grid 114 when smart power hub 120 is installed in EV 100.

FIG. 5 shows connections to a smart power hub. Smart power hub 120 contains bi-directional converters to convert between AC and DC, and between different DC voltages. These conversion circuits are optimized for use inside an EV.

The AC port to smart power hub 120 connects to AC power grid 136, which can be single-phase AC or 3-phase AC. AC power may flow from AC power grid 136 to smart power hub 120, or from smart power hub 120 to home appliances on AC power grid 136.

Battery 132 is the primary battery in the EV, such as battery 106 in FIGS. 1-4. Battery 132 is connected through the DC1 port. DC current can flow from smart power hub 120 to battery 132 (charging mode), or from battery 132 to smart power hub 120 (discharging mode).

A second battery can be connected to smart power hub 120 through port DC3. Secondary battery 134 can be a battery in a second EV that is connected through a second smart power hub 120 (not shown) on port DC3. Smart power hub 120 can charge secondary battery 134 from primary battery 132 (DC1 to DC3), or can charge primary battery 132 from secondary battery 134 (DC3 to DC1).

DC loads 138 on port DC2 can be auxiliary on-board devices on EV 100, such as heaters, instruments, radios, lights, or power converters/ports for handheld devices. These can be 24-volt DC automotive devices. DC loads 138 can only receive power from smart power hub 120, so this is a unidirectional port.

FIGS. 6A-6F show modes of operation of the smart power hub. In FIG. 6A, the Grid-to-Voltage (G2V) mode has smart power hub 120 receiving AC power from the AC port to AC power grid 136 that is converted to DC power to primary battery 132 on port DC1. This mode uses the AC power grid to charge the EV battery.

In FIG. 6B, primary battery 132 supplies DC current to smart power hub 120, which converts the DC power to AC power that is transferred to AC power grid 136 through the AC port. This is the Voltage-to-Grid (V2G) mode. Smart power hub 120 operates as a Current Source Inverter (CSI) in V2G mode.

In FIG. 6C, solar panels 112 are connected to the DC3 port in place of secondary battery 134. The DC power from solar panels 112 is sent over port DC3 to smart power hub 120 and then sent over the DC1 port to charge primary battery 132. This is the Solar-to-Voltage (S2V) mode. Smart power hub 120 performs a DC-to-DC conversion in S2V mode to convert the solar voltage to the battery charging voltage.

In FIG. 6D, primary battery 132 supplies DC current to smart power hub 120, which converts the DC to AC to drive AC home appliances through the AC port. This is the Voltage-to-Home (V2H) mode. Home appliances that are plugged into a dedicated off-grid AC plug or cable to smart power hub 120 can be powered by primary battery 132 for a period of time in the V2H mode. These home appliances are off-grid for V2H mode. Smart power hub 120 operates as a Voltage-Source Inverter (VSI) during V2H mode.

In FIG. 6E, primary battery 132 supplies DC current to smart power hub 120, which converts the DC to 24 volts to drive DC loads 138 on port DC2. DC loads 138 can be on-board auxiliary devices such as automotive heaters, instruments, etc. This is the Voltage-to-Load (V2L) mode.

In FIG. 6F, secondary battery 134 is connected to the DC3 port and primary battery 132 is connected to port DC1. The DC power from secondary battery 134 is sent over port DC3 to smart power hub 120 and then sent over the DC1 port to charge primary battery 132. This is the Voltage-to-Voltage (V2V) mode. Smart power hub 120 may also operate in reverse, charging secondary battery 134 from primary battery 132.

Figure 7:
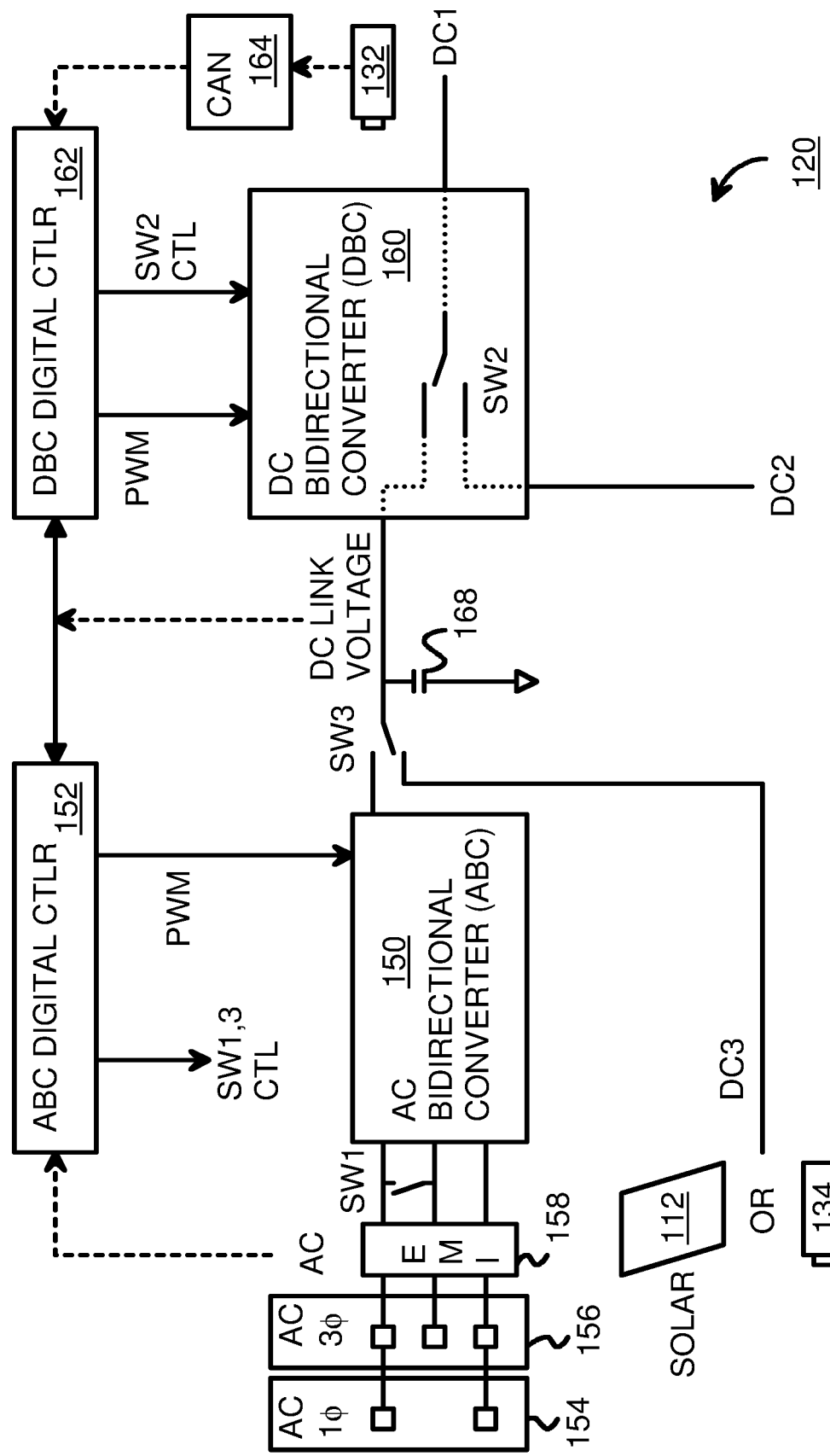
FIG. 7 is a diagram of a smart power hub.

FIG. 7 is a diagram of a smart power hub. Smart power hub 120 has four ports AC, DC1, DC2, and DC3. These ports are bi-directional, allowing for charging or discharging modes, with the exception that port DC2 is unidirectional, since only loads are attached to port DC2, such as for V2L mode shown in FIG. 6E.

Smart power hub 120 has an AC front end and a DC back end. The AC port connects to AC bi-directional converter 150 (ABC), while DC ports DC1 and DC2 connect to DC bi-directional converter 160 (DBC). AC bi-directional converter 150 and DC bi-directional converter 160 are connected together by a DC link voltage that is generated on link capacitor 168.

Three relays or switches SW1, SW2, SW3 configure connections within smart power hub 120 to perform the various operating modes shown in FIGS. 6A-6F. Switch SW3 can connect AC bi-directional converter 150 to DC bi-directional converter 160 for most modes, but can disconnect AC bi-directional converter 150 and instead connect port DC3 directly to DC bi-directional converter 160, bypassing AC bi-directional converter 150 for S2V and V2V modes (FIGS. 6C, 6F) that do not use AC.

AC bi-directional converter 150 is bypassed in S2V mode (FIG. 6C). The S2V mode allows solar panels 112 on port DC3 to directly charge primary battery 132 on port DC1 using only DC bi-directional converter 160. S2V mode is a DC-to-DC charging mode that avoids an inefficient conversion to AC. Secondary battery 134 could also be charged or discharged on port DC3 in V2V mode (FIG. 6F), where DC bi-directional converter 160 can be operated in either direction and AC bi-directional converter 150 is disabled.

Switch SW2 within DC bi-directional converter 160 can be switched to connect AC bi-directional converter 150 to DC bi-directional converter 160 or to port DC3. When switch SW2 is switched to port DC2, then the AC and DC3 inputs are isolated and not used. In this V2L mode (FIG. 6E), switch SW2 connects DC loads 138 on port DC2 to be powered by primary battery 132 on port DC1, using DC bi-directional converter 160 in a reverse direction mode. This V2L mode can be used to discharge primary battery 132 to provide auxiliary power to drive DC loads 138 such as heaters, instruments, and other devices onboard EV 100 (FIG. 3-4).

The AC port can be plugged into either standard one-phase AC plug 154, or into three-phase AC plug 156. The standard AC has one AC sine wave on two wires (P, N), while the 3-phase AC has three AC sine waves, separated by a 120-degree phase, on three wire inputs A, B, C. Most home AC is single phase, but superchargers located at office and commercial buildings have access to three-phase AC, which is used to power commercial-grade air conditioning and lighting units.

The P and A inputs of one-phase AC plug 154 and three-phase AC plug 156 are shorted together and applied to AC bi-directional converter 150. Likewise, the N and C inputs of one-phase AC plug 154 and three-phase AC plug 156 are shorted together and applied to AC bi-directional converter 150. The middle B input from three-phase AC plug 156 is input to AC bi-directional converter 150 without any connection to one-phase AC plug 154. However, when one-phase AC plug 154 is used and three-phase AC plug 156 is not used, such at a home installation, switch SW1 shorts upper input A/P to middle input B, so that the upper and middle AC inputs to AC bi-directional converter 150 are shorted together by switch SW1.

When one-phase AC plug 154 is not used but three-phase AC plug 156 is used, such at a commercial supercharger installation, switch SW1 is open, isolating upper input A(P) from middle input B, so that the upper and middle AC inputs to AC bi-directional converter 150 are isolated by switch SW1. AC bi-directional converter 150 then receives all three A, B, C inputs from three-phase AC plug 156. Electro-Magnetic Interference (EMI) filter 158 is connected to the A, B, and C inputs to filter noise such as unwanted harmonics on the AC input.

Switches SW1 and SW3 are controlled by ABC digital controller 152, while switch SW2 is controlled by DBC digital controller 162. ABC digital controller 152 generates Pulse-Width-Modulated (PWM) control signals to the gates of transistors within AC bi-directional converter 150 to control the direction, voltages, and power-factor correction of the AC-DC or DC-AC conversion performed by AC bi-directional converter 150. Similarly, DBC digital controller 162 also generates PWM control signals to the gates of transistors within DC bi-directional converter 160 to control the direction, voltages, and other conversion properties of the DC-DC conversion performed by DC bi-directional converter 160.

ABC digital controller 152 senses the voltages and currents on the AC inputs to determine whether 1-phase or 3-phase AC is present. Controller Area Network (CAN) monitor 164 monitors the status of primary battery 132 and reports battery status to DBC digital controller 162. The DC2 and DC3 ports can also be monitored. A bus between ABC digital controller 152 and DBC digital controller 162, such as a RS485 bus, can be used for inter-controller communication. The DC link voltage on link capacitor 168 is also monitored by ABC digital controller 152 and/or DBC digital controller 162.

Figure 8:
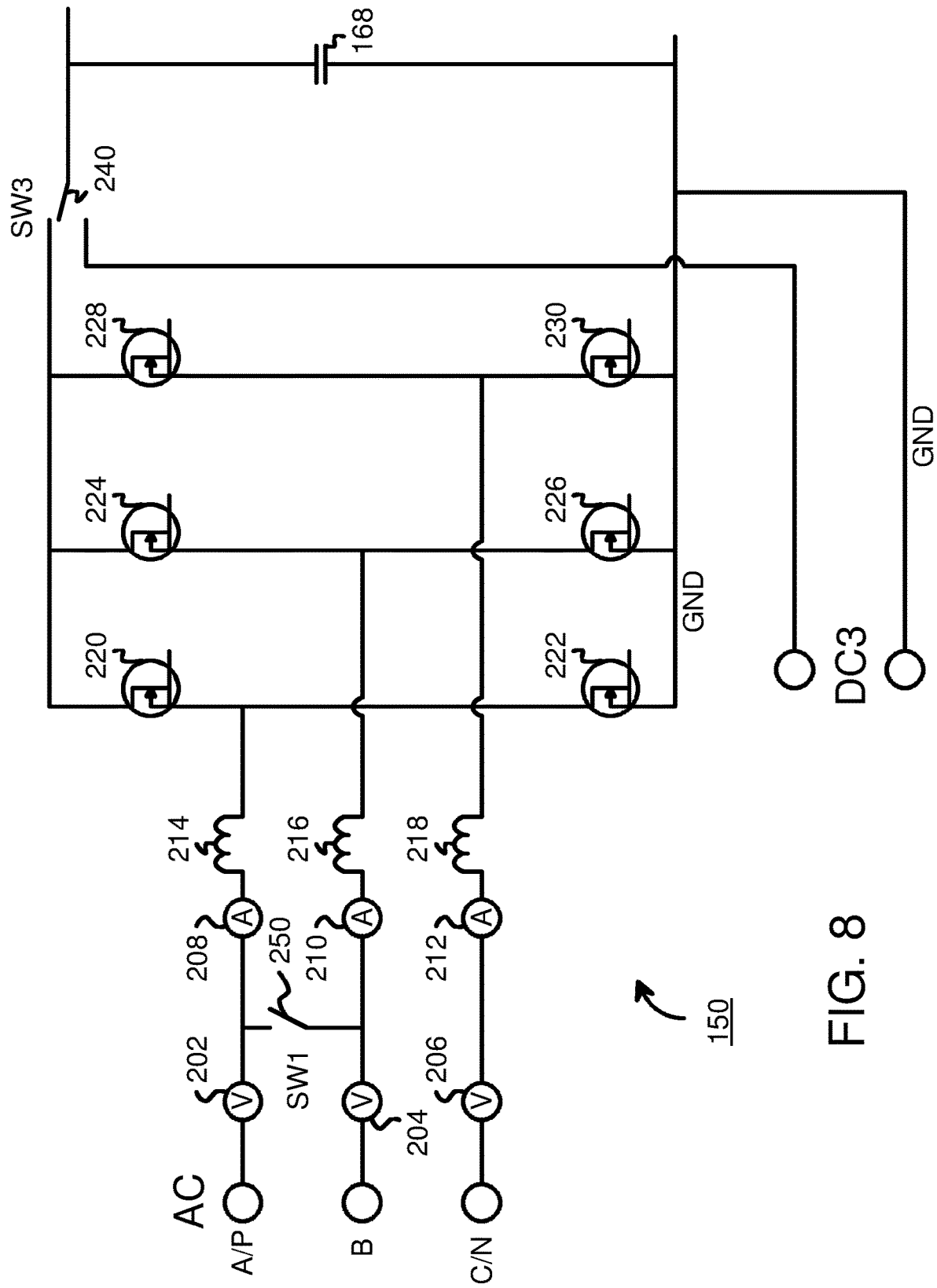
FIG. 8 is a schematic of the AC bi-directional converter.

FIG. 8 is a schematic of the AC bi-directional converter. Voltages sensors 202, 204, 206 sense the voltages on the A(P) B, and C(N) AC inputs, respectively, while current sensors 208, 210, 212 sense the respective currents flowing on these lines. Inductors 214, 216, 218 are series inductors to filter harmonics and other noise on the AC inputs.

Switch SW1 250 is open for three-phase AC and closed for one-phase AC. Switch 250 shorts AC input B to AC input A/P when one-phase AC is applied and three-phase AC is not available.

Switch SW3 240 can select either port DC3 or the AC-converted voltage to charge link capacitor 168 and link to DC bi-directional converter 160.

During G2V mode when connected to a single-phase AC grid, switch SW1 250 is closed. Transistors 220, 222, 224, 226 operate at a fast switching frequency, such as 100-200 KHz, while transistors 228, 230 operate at a slower AC-line frequency (50 Hz or 60 Hz). Transistors 220, 222 form a fast switching bridge with complementary PWM drive signals applied to their gates. Transistors 224, 226 form another fast switching bridge with complementary PWM drive signals applied to their gates. The gate of pull-up transistor 220 is driven by a PWM drive signal that is 180 degrees out of phase with the PWM drive signal applied to the gate of pull-up transistor 224. Similarly, the PWM drive signal applied to the gate of pull-down transistor 222 is delayed in phase by 180 degrees compared with the PWM drive signal applied to the gate of pull-down transistor 226. This 180-degree phase difference causes the currents through transistors 220, 222 to be interleaved with transistors 224, 226. This interleaved operation can reduce the AC ripple current.

Transistors 228, 230 form a line frequency bridge. When AC input voltage is in the positive part of its cycle, transistor 230 is constantly turned on, and transistor 228 is constantly turned off. When AC input voltage is in its negative part of the AC cycle, transistor 228 is constantly turned on, and transistor 230 is constantly turned off. The ABC digital controller 152 generates the PWM control signals to transistors 220, 222, 224, 226 that switch at the higher switching frequency, and generate the PWM control signals to transistors 228, 230 that switch at the slower AC line frequency. ABC digital controller 152 control AC bi-directional converter 150 to operate as an interleaving totem pole power factor correction control, using the control loop shown later in FIG. 10.

During G2V mode when a three-phase AC grid is connected, switch SW1 250 is open. Transistors 220, 222 form one fast switching bridge for the A/P input. The gates of transistors 220, 222 receive complementary PWM driving signals. Transistors 224, 226 form another fast switching bridge, but this bridge is for the B input. The gates of transistors 224, 226 receive complementary PWM driving signals. Transistors 228, 230 form another fast switching bridge. This bridge is for the C/N input. The gates of transistors 228, 230 receive complementary PWM driving signals.

ABC digital CTLR 152 controls AC bi-directional converter 150 to operate with three-phase power factor correction using space vector PWM driving signals for transistors 220, 222, 224, 226, 228, 230.

For one-phase mode, the timing of the PWM control signals generated by ABC digital controller 152 is altered.

Since the A and B AC inputs are shorted together by switch SW1, the PWM signal applied to the gates of pull-up transistor 220 and pull-down transistor 222 are 180-degrees out of phase with the PWM signals applied to the gates of pull-up transistor 224 and pull-down transistor 226, respectively. This 180-degree phase shift provides an interleaving effect. The PWM signals applied to the gate of pull-up transistor 228 and to pull-down transistor 230 has the power-line frequency, such as 50 Hz or 60 Hz. The PWM signals to the gates of transistors 220, 222, 224, 226 operate at a higher switching frequency, such as 100-200 KHz.

When the AC input is one-phase, AC bi-directional converter 150 operates as an interleaving totem pole Power Factor Correction (PFC) converter. Pull-up transistor 220 is interleaved with transistor 224, and transistor 222 is interleaved with transistor 226, since their control gates are drive with PWM signals that are 180-degrees out of phase with each other. When operating from a three-phase AC input, three-phase power factor correction is provided by AC bi-directional converter 150 using a so-called B6 topology with switch SW1 open. Either one-phase or three-phase AC input can operate with low AC input harmonic and high power factor by implementing control mode through ABC digital controller 152.

Figure 9:
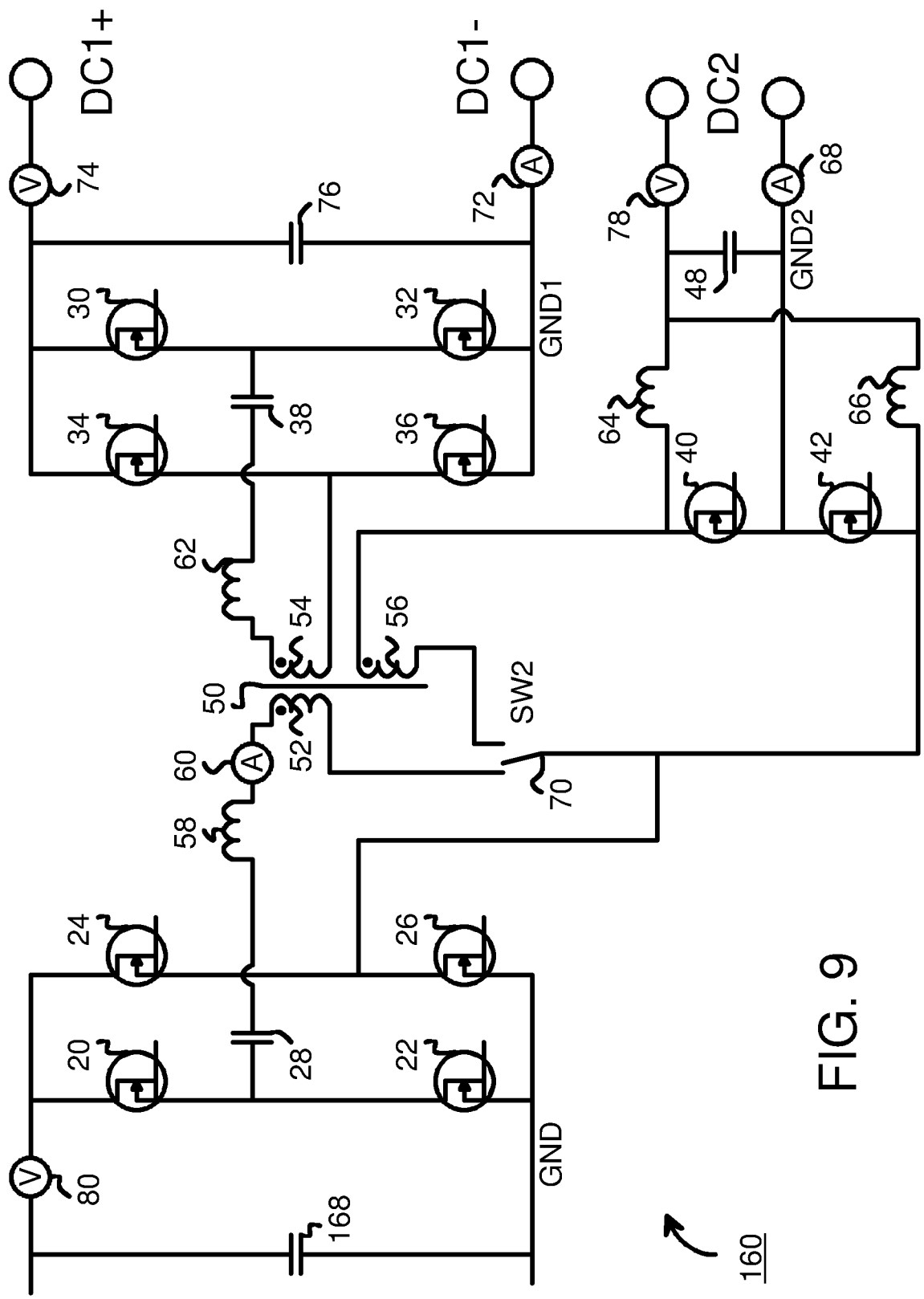
FIG. 9 is a schematic of the DC bi-directional converter.

FIG. 9 is a schematic of the DC bi-directional converter. Transformer 50 isolates voltages and currents on the primary side that flow through primary windings 52 from the currents in the secondary side flowing through secondary windings 54 and auxiliary windings 56. Switch SW2 70 breaks current flow for either primary windings 52 or auxiliary windings 56. Thus transformer 50 inductively couples secondary windings 54 to either primary windings 52 or to auxiliary windings 56, but not to both.

When switch SW2 70 disconnects auxiliary windings 56 and the DC2 loop, current can flow through primary windings 52. The rectified AC voltage from AC bi-directional converter 150 is filtered by link capacitor 168 to generate the DC link voltage that is sensed by voltage sensor 80. The DC link voltage and ground are connected to a full bridge of transistors 20, 22, 24, 26. The midpoint of the bridge between transistors 20, 22 is connected to capacitor 28, which is in series with inductor 58 and primary windings 52. The current flowing through primary windings 52 is measured by current sensor 60. This current through primary windings 52 then flows through switch SW2 70 to the second interior node of the bridge, between transistors 24, 26.

The gates of transistors 20, 22, 24, 26 are controlled by DBC digital controller 162. These gates can be driven by Pulse-Frequency-Modulation (PFM) signals. These PFM drive signals have a high frequency that is variable (e.g. 50 KHz-200 KHz) with a fixed pulse duty cycle around 50%. The PFM control signal applied to the gate of transistor 22 is complementary to the control signal applied to the gate of transistor 20. Likewise, the PFM control signal applied to the gate of transistor 24 is complementary to the control signal applied to the gate of transistor 26.

DC bi-directional converter 160 also has a secondary side bridge of transistors 30, 32, 34, 36 that also have gates driven by PFM signals from DBC digital controller 162. The interior bridge node between transistors 30, 32 and the other interior bridge node between transistors 34, 36 are connected together by a loop that includes capacitor 38, inductor 62, and secondary windings 54 in series. The output of this secondary side bridge charges capacitor 76 and drives port DC1, with the DC1 voltage measured by voltage sensor 74 and the DC1 current measured by current sensor 72.

A third, auxiliary loop is formed by auxiliary windings 56 when switch SW2 70 selects the DC2 loop and disconnects the primary side loop. Current from primary battery 132 on port DC1 flows through the secondary side bridge and secondary windings 54, which causes mutual inductance in transformer 50 to generate a current flowing through auxiliary windings 56. This auxiliary current from auxiliary windings 56 is filtered by inductors 64, 66 and flows to port DC2 where voltage sensor 78 measures the positive DC2 voltage. The current through the ground GND2 terminal of port DC2 is measured by current sensor 68. Transistors 40, 42 connect the two terminals of auxiliary windings 56 to GND2 and act as Synchronous Rectification (SR) transistors. Capacitor 48 is coupled across the two terminals of port DC2. DC loads 138 on port DC2 can be powered by primary battery 132 when switch SW2 70 closes the current loop through auxiliary windings 56. In this V2L mode (FIG. 6E) DC bi-directional converter 160 operates as a phase-shift full bridge in the secondary loop with synchronous rectification in the auxiliary loop.

When switch SW2 70 closes the primary loop and disconnects the auxiliary loop, DC bi-directional converter 160 acts as a CLLLC resonant tank for a power converter, where C represents a capacitor and L represents an inductor. Capacitors 28, 38 in the primary side bridge and the secondary side bridge, respectively, are connected by inductors 58, 62 in the primary and secondary sides, respectively, and the magnetic inductance of transformer 50. This is a CLLLC structure with three inductors in series between the end capacitors. The frequency of the PFM signals applied to the gates of transistors 20, 22, 24, 26 can be selected to achieve a desired DC gain from the DC link voltage to DC1. When the switching frequency equals the CLLLC resonant tank frequency, the DC gain is one with a highest switching frequency. When the switching frequency is above the CLLLC resonant tank frequency, the DC gain is below one, with a DC1 voltage step-down mode for DC bi-directional converter 160. When the switching frequency is below the CLLLC resonant tank frequency, the DC gain is above one, with a DC1 voltage step-up mode for DC bi-directional converter 160.

When operating in the reverse direction, the gates of transistors 30, 32, 34, 36 can be driven with PWM signals having a frequency that matches the resonant frequency of the CLLLC structure. The switching frequency of the PWM control signals applied to the transistor gates is fixed, with peak conversion efficiency occurring when the switching frequency matches the CLLLC resonant frequency.

Figure 10:
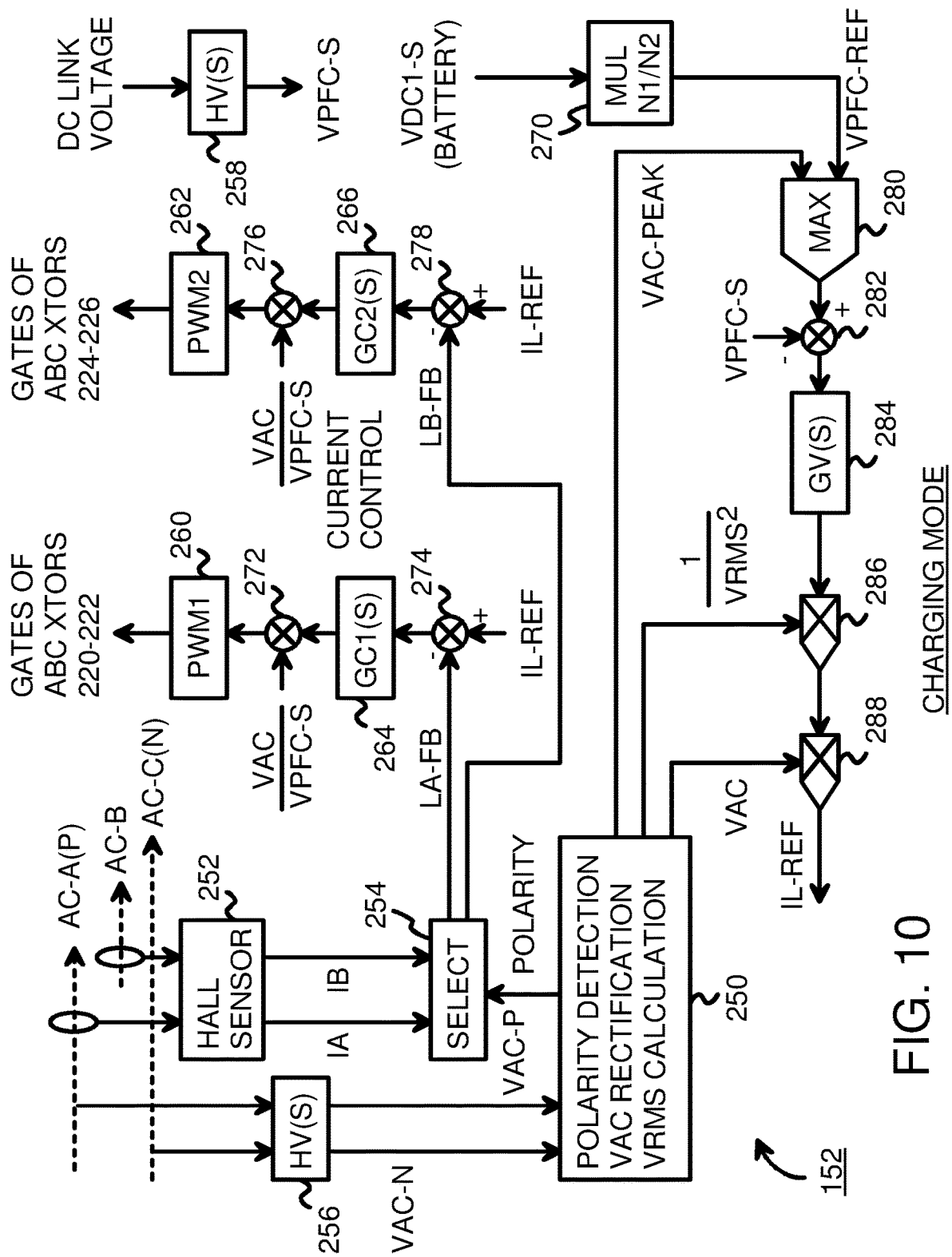
FIG. 10 is a diagram of ABC digital controller when configured for a charging mode with totem-pole power-factor correction.

FIG. 10 is a diagram of ABC digital controller when configured for a charging mode with totem-pole power-factor correction. Charging mode in this example is when primary battery 132 is being charged from AC, such as modes G2V (FIG. 6A).

Rather than have a constant DC link voltage, the DC link voltage is allowed to rise as the battery voltage is increasing, or vice-versa. DBC digital controller 162 uses DC-link adaptive control to reduce the operating range of the switching frequency and improve efficiency compared to having a fixed DC link voltage.

ABC digital controller 152 obtains the battery voltage of primary battery 132 from DBC digital controller 162 and uses the battery voltage to adjust the PWM control signals. The DC1 battery voltage VDC1-S is multiplied by the turns ratio N1/N2 by turns multiplier 270 to generate a reference battery voltage for the whole control loop, VPFC-REF. N1 is the turns in primary windings 52 and N2 is the turns in secondary windings 54. This reference battery voltage is compared to the peak AC voltage, VAC-PEAK, and the maximum of these two voltages is selected by maximum selector 280. The DC link voltage is sampled by voltage sampler 258 to generate VPFC-S, which is subtracted by adder 282 from the maximum voltage selected by maximum selector 280. Proportional-Integrator (PI) 284 integrates the sum from adder 282, which is then multiplied in multiplier 286 by the reciprocal of the square of the Root-Mean-Square (RMS) AC voltage, and then multiplied in multiplier 288 by the current AC voltage, VAC, to generate current reference IL-REF.

The current flowing through the A and B AC lines are sensed by hall sensor 252 as currents IA and IB, respectively. The AC voltages of the A and C lines are sensed by voltage sensor 256 as VAC-P and VAC-N, respectively. Polarity detector and calculator 250 rectifies VAC and calculates VRMS and also generates a polarity signal that causes selector 254 to select IA or IB to generate LA-FB and LB-FB.

This LA-FB current from selector 254 is subtracted from the reference current IL-REF by adder 274, then integrated by Proportional-Integrator (PI) 264 and multiplied by VAC/(VPFC-S) by multiplier 272 to control the pulse width or duty cycle of the control signals to the gates of pull-up transistor 220 and pull-down transistor 222 that are generated by PWM controller 260.

The LB-FB current from selector 254 is subtracted from the reference current IL-REF by adder 278, then integrated by Proportional-Integrator (PI) 266 and multiplied by VAC/(VPFC-S) by multiplier 276 to control the pulse width of the control signals to the gates of pull-up transistor 224 and pull-down transistor 226 that are generated by PWM controller 262.

The PWM control signals to the gates of pull-up transistor 228 and pull-down transistor 230 are generated by another PWM controller (not shown) to have a switching frequency equal to the AC input frequency, such as 50 Hz or 60 Hz for single-phase AC operation. For three-phase AC operation, space-vector PWM control signals are generated.

Figure 11:
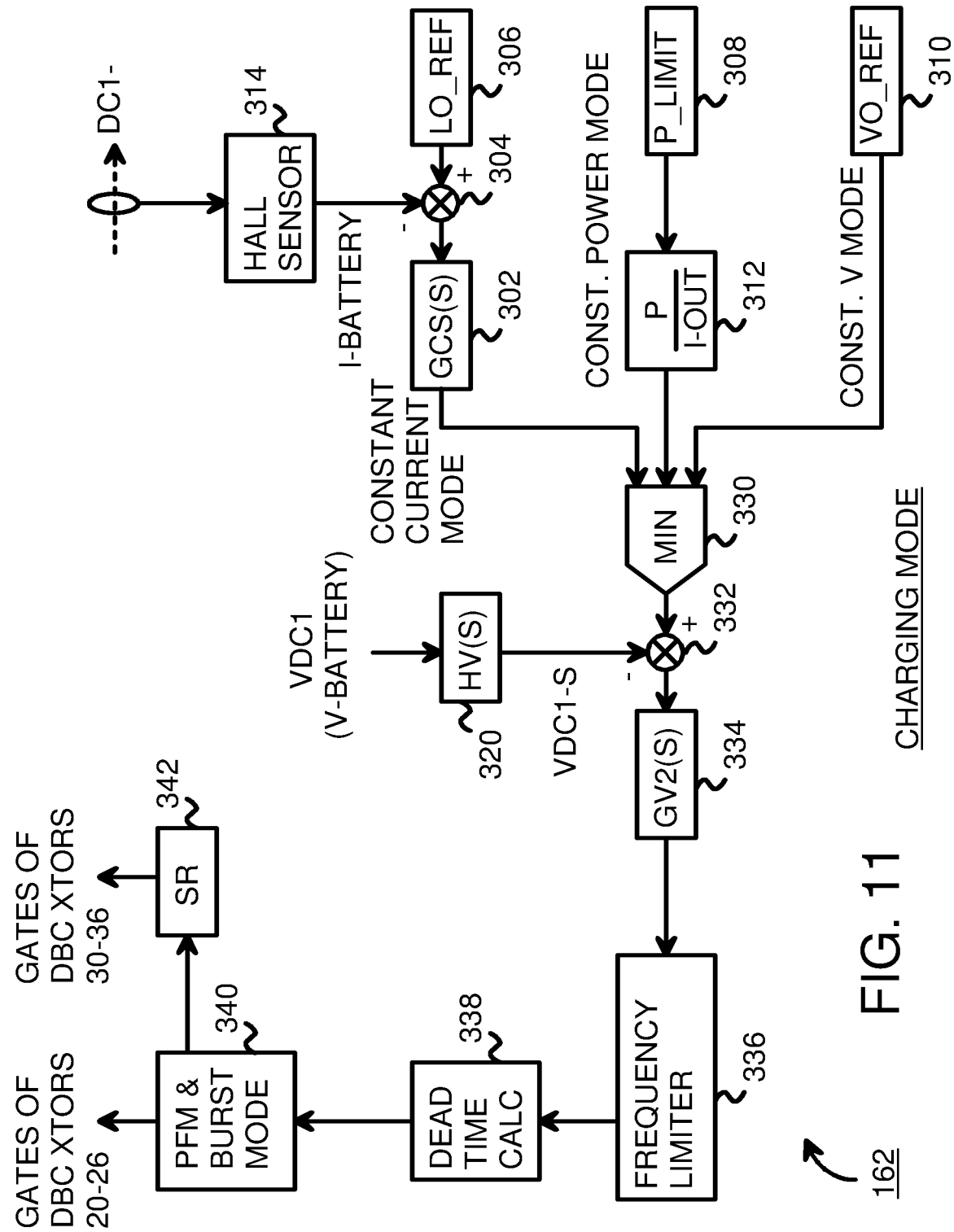
FIG. 11 shows the DBC digital controller configured for a charging mode.

FIG. 11 shows the DBC digital controller configured for a charging mode. Hall sensor 314 senses the battery current I-BATERY flowing through the battery ground, DC1-. This battery current is subtracted by adder 304 from the low reference current LO_REF in register 306 and integrated by Proportional-Integrator (PI) 302 to obtain the constant-current mode reference.

The power limit P_LIMIT in register 308 is multiplied in multiplier 312 by P/(I-OUT), the power divided by the output current to generate the constant-power mode reference. The constant-voltage mode reference, VO_REF, from register 310 is also input to minimum selector 330, which selects the minimum reference from among the constant-current mode, constant-power mode, and constant-voltage modes. Thus for battery charging, all three modes, Constant-Voltage (CV), Constant-Current (CC), and Constant-Power (CP), are considered by the control loop in DBC digital controller 162.

The battery voltage VDC1 sensed by voltage sensor 320 is subtracted by adder 332 from the minimum selected by minimum selector 330 and then integrated by Proportional-Integrator (PI) 334. The resulting frequency is limited to a range, such as 100-200 KHz by frequency limiter 336, and the dead time calculated by calculator 338. Dead-time calculator 338 calculates the dead time when the pull-up and pull-down transistors are both off during switching to prevent current surges. The PFM control signals to the gates of transistors 20, 22, 24, 26 are generated by PFM controller 340 based on the control loop calculations while the control signals to the gates of transistors 30, 32, 34, 36 are generated by SR controller 342.

Figure 12:
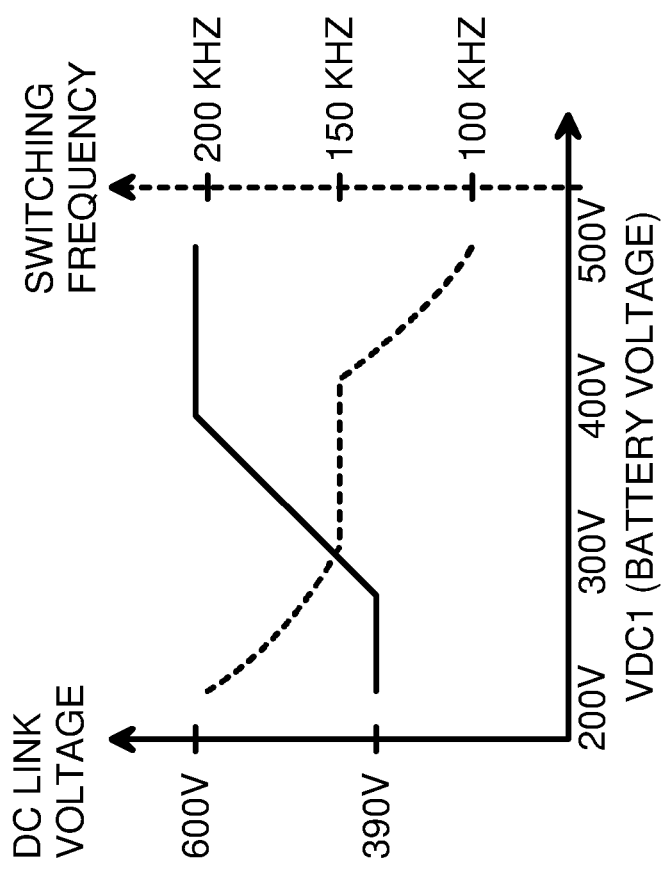
FIG. 12 is a graph showing a variable DC link voltage with a variable switching frequency mode supporting a wide voltage range of the battery voltage.

FIG. 12 is a graph showing a variable DC link voltage with a variable switching frequency mode supporting a wide range of battery voltage. ABC digital controller 152 adjusts the PWM signal switching frequency from 200 KHz down to 100 KHz in response to the battery voltage rising from 200 up to 500 volts during charging. The rising battery voltage causes the DC link voltage to rise from 390 volts up to about 600 volts when the battery is fully charged.

The battery voltage is input to the control loop in DBC digital controller 162, causing the switching frequency to be reduced from 200 KHz down to 100 KHz as charging progresses and the DC link voltage rises.

Efficiency is highest when the switching frequency matches the resonant frequency of the CLLLC structure of DC bi-directional converter 160. For example, the capacitance and inductance values can be set to achieve a CLLC resonant tank frequency of 150 KHz, in the middle of the 100-200 KHz operating range. The peak efficiency is achieved when DC1 ranges from 300 V to 400 V with the switching frequency equal to the CLLLC resonant tank frequency for variable DC link voltage.

Figure 13:
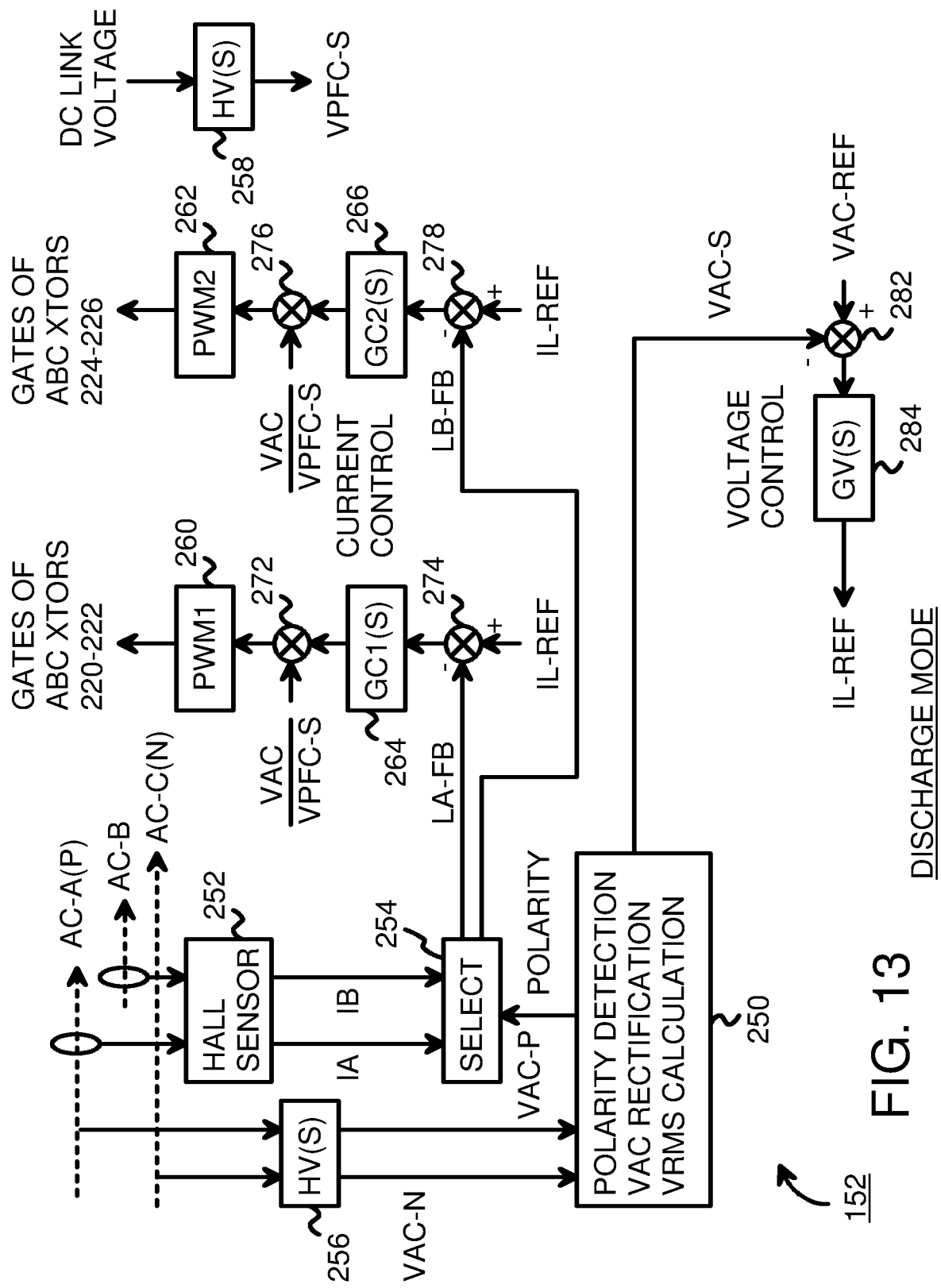
FIG. 13 is a diagram of ABC digital controller when configured for a discharging mode.

FIG. 13 is a diagram of ABC digital controller when configured for a discharging mode. Discharging mode in this example is when primary battery 132 is being discharged to drive AC appliances, such as modes V2G (FIG. 6B) or V2H (FIG. 6D). AC bi-directional converter 150 and DC bi-directional converter 160 are operating in a reverse direction compared with charging modes.

Rather than have a constant DC link voltage, the DC link voltage is allowed to fall as the battery is being discharged. However, rather than have a variable switching frequency as is the case for the forward (charging) direction of operation, the switching frequency is fixed for the reverse (discharging) direction of operation. The switching frequency is fixed at the resonant frequency of the CLLLC resonant structure in DC bi-directional converter 160. Since the switching frequency is set to the resonant frequency, efficiency is very high. The efficiency of DC bi-directional converter 160 when operating with a fixed switching frequency can be greater than 99%.

The current flowing through the A and B AC lines are sensed by hall sensor 252 as currents IA and IB, respectively. The AC voltages of the A and C lines are sensed by voltage sensor 256 as VAC-P and VAC-N, respectively. Polarity detector and calculator 250 rectifies VAC and generates a polarity signal that causes selector 254 to select IA or IB to generate LA-FB and LB-FB.

This LA-FB current from selector 254 is subtracted from the reference current IL-REF by adder 274, then integrated by Proportional-Integrator (PI) 264 and multiplied by VAC/(VPFC-S) by multiplier 272 to control the pulse width or duty cycle of the control signals to the gates of pull-up transistor 220 and pull-down transistor 222 that are generated by PWM controller 260.

The LB-FB current from selector 254 is subtracted from the reference current IL-REF by adder 278, then integrated by Proportional-Integrator (PI) 266 and multiplied by VAC/(VPFC-S) by multiplier 276 to control the pulse width of the control signals to the gates of pull-up transistor 224 and pull-down transistor 226 that are generated by PWM controller 262.

The PWM control signals to the gates of pull-up transistor 228 and pull-down transistor 230 are generated by another PWM controller (not shown) to have a switching frequency equal to the AC input frequency, such as 50 Hz or 60 Hz for single-phase AC operation. For three-phase AC operation, space-vector PWM control signals are generated.

Polarity detector and calculator 250 generates a sampled VAC voltage, VAC-S, from the AC sensed on AC lines A/P, B, and C/N. This VAC-S voltage is subtracted by adder 282 from a reference AC signal, VAC-REF, that has a line frequency (50 HZ or 60 HZ) for Voltage Source Inverter (VSI) control. Proportional-Integrator (PI) 284 integrates the sum from adder 282 to generate current reference IL-REF. The DC link voltage is sampled by voltage sampler 258 to generate VPFC-S.

Figure 14:
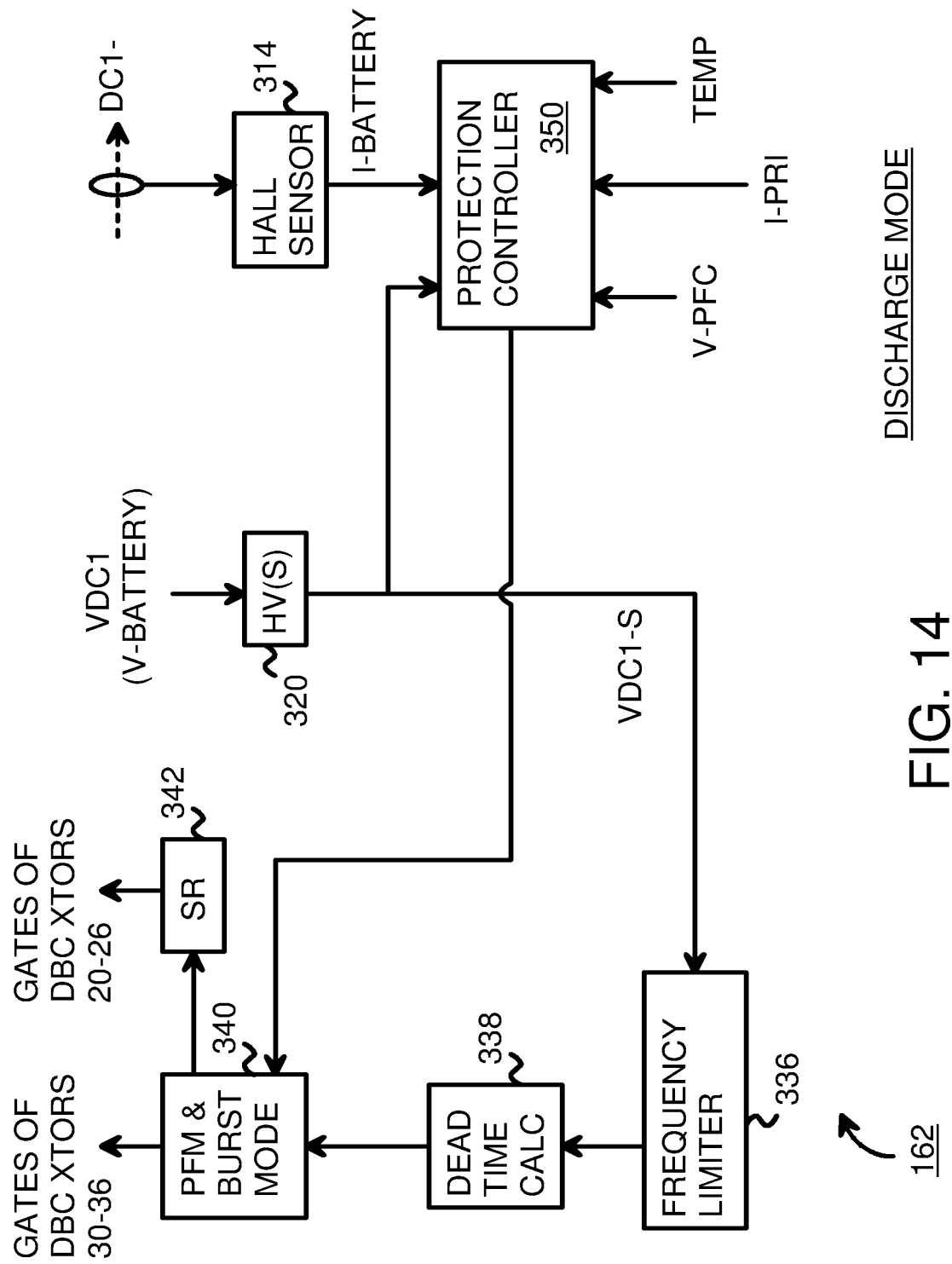
FIG. 14 shows the DBC digital controller configured for a discharging mode.

FIG. 14 shows the DBC digital controller configured for a discharging mode. Hall sensor 314 senses the battery current I-BATERY flowing through the battery ground, DC1-. The battery voltage VDC1-S sensed by voltage sensor 320 and applied to protection controller 350 along with battery current I-Battery. Other inputs to protection controller 35 may include the temperature TEMP, primary current through primary windings 52, I-PRI, and the DC link voltage V-PFC (V-PFC-S from voltage sampler 258 in FIG. 13). Protection controller 350 compares these inputs or functions of these inputs to pre-set limits to protect the circuit from failure caused by over-heating, current overload in primary windings 52, battery voltage or current overload condition, and other voltage out-of-operating-range conditions. Protection controller 350 can instruct PFM controller 340 shut down the PFM control signals or reduce the duty cycle to reduce current flow to protect the circuit. The switching frequency fixed to 150 KHz.

The battery voltage VDC1 sensed by voltage sensor 320 is input to frequency limiter 336 and used to set the switching frequency to a fixed frequency, such as 150 KHz by frequency limiter 336. The dead time calculated by calculator 338 is used to adjust the frequency. Dead-time calculator 338 calculates the dead time when the pull-up and pull-down transistors are both off during switching to prevent current shorts between transistors. The PFM control signals to the gates of transistors 30, 32, 34, 36 are generated by PWM controller 340 based on the control loop calculations while the control signals to the gates of transistors 20, 22, 24, 26 are generated by SR controller 342.

Figure 15:
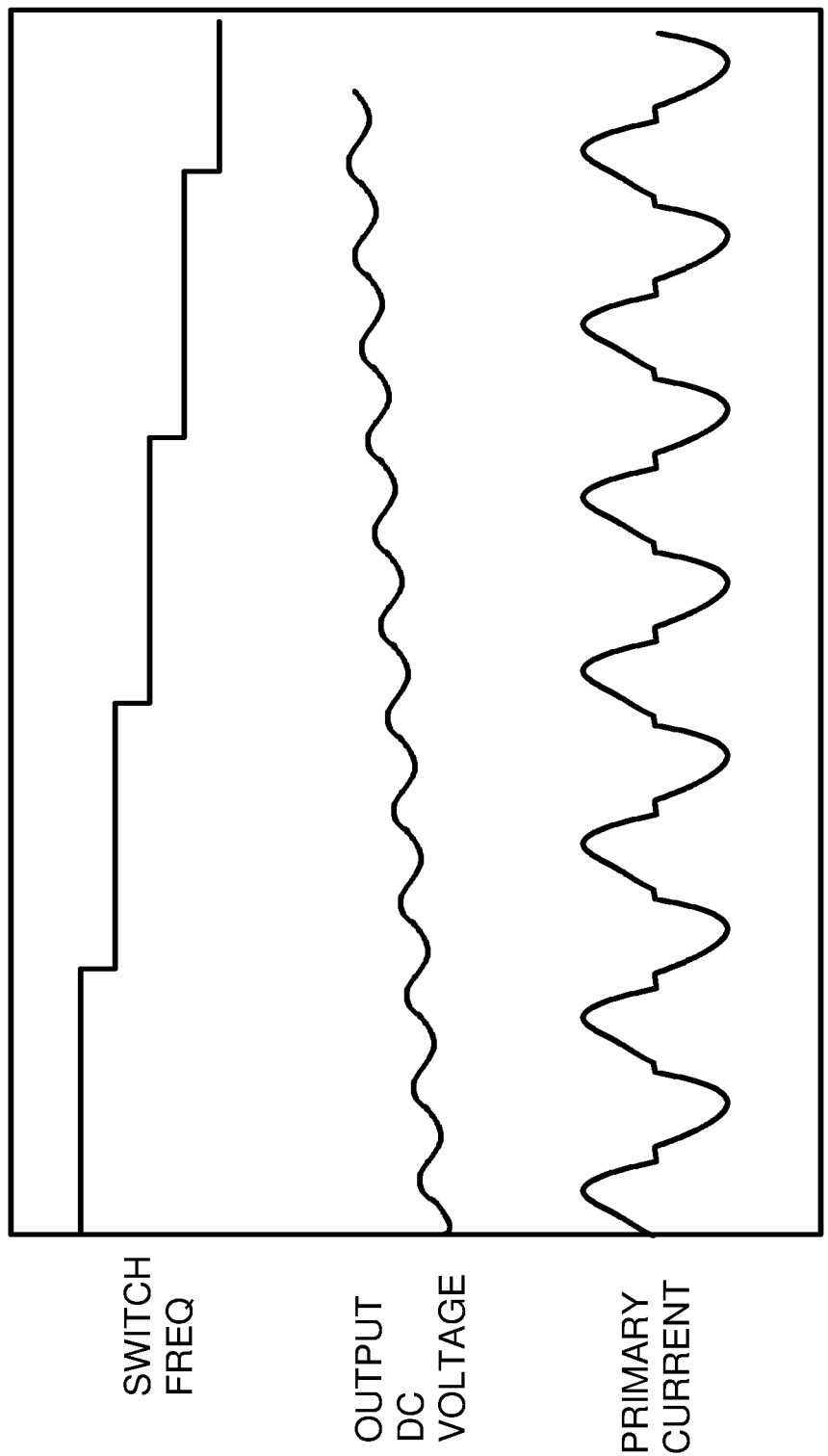
FIG. 15 is a plot showing the switching frequency being stepped down as the battery voltage rises during charging.

FIG. 15 is a plot showing the switching frequency being stepped down as the battery voltage rises during charging. The switching frequency of the PFM control signals to transistors 20-26 is reduced in steps by PFM controller 340 (FIG. 11) as VDC1, the battery voltage, is increased during charging mode since the battery voltage is subtracted by adder 332.

The DC output voltage (battery voltage) is relatively constant with a slight variation or ripple from the AC input, but the fluctuations are very small. The DC output voltage is very gradually rising over time. The primary current through primary windings 52 (FIG. 9) also oscillates with the AC input voltage.

Figure 16:
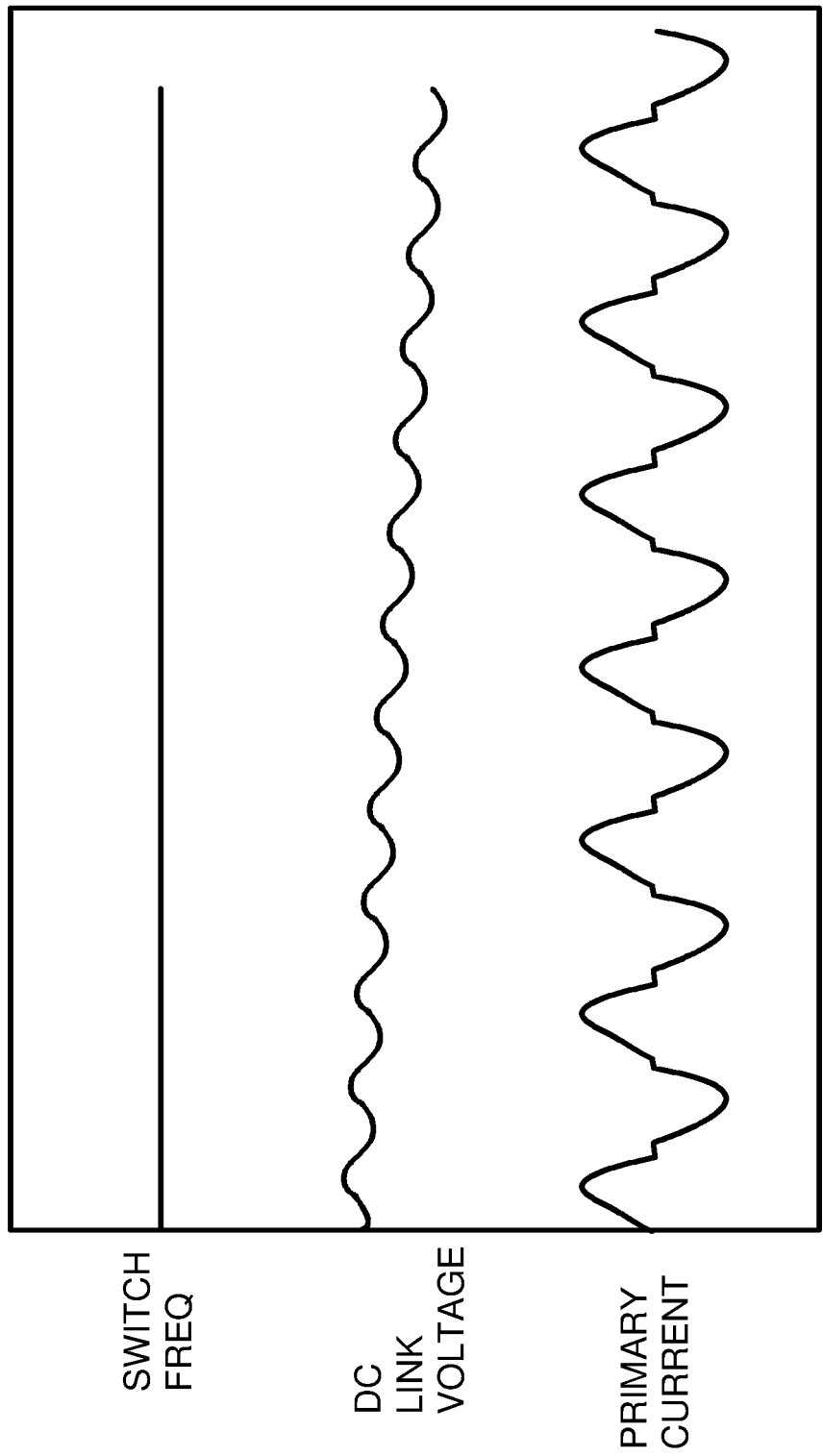
FIG. 16 is a plot of a constant switching frequency during battery discharge.

FIG. 16 is a plot of a constant switching frequency during battery discharge. The switching frequency is set to the resonant frequency of the CLLLC structure in DC bi-directional converter 160, such as 150 KHz. High efficiency is achieved by matching the switching frequency to the resonant frequency.

The DC link voltage is relatively constant with a slight variation or ripple. The DC link voltage fluctuates with the AC being generated, but the fluctuations are very small. The DC link voltage is gradually falling over time in FIG. 16 during charging mode with battery voltage DC1 decreasing when discharging energy. The primary current through primary windings 52 (FIG. 9) oscillates with the AC voltage being generated by AC bi-directional converter 150.

Figure 17:
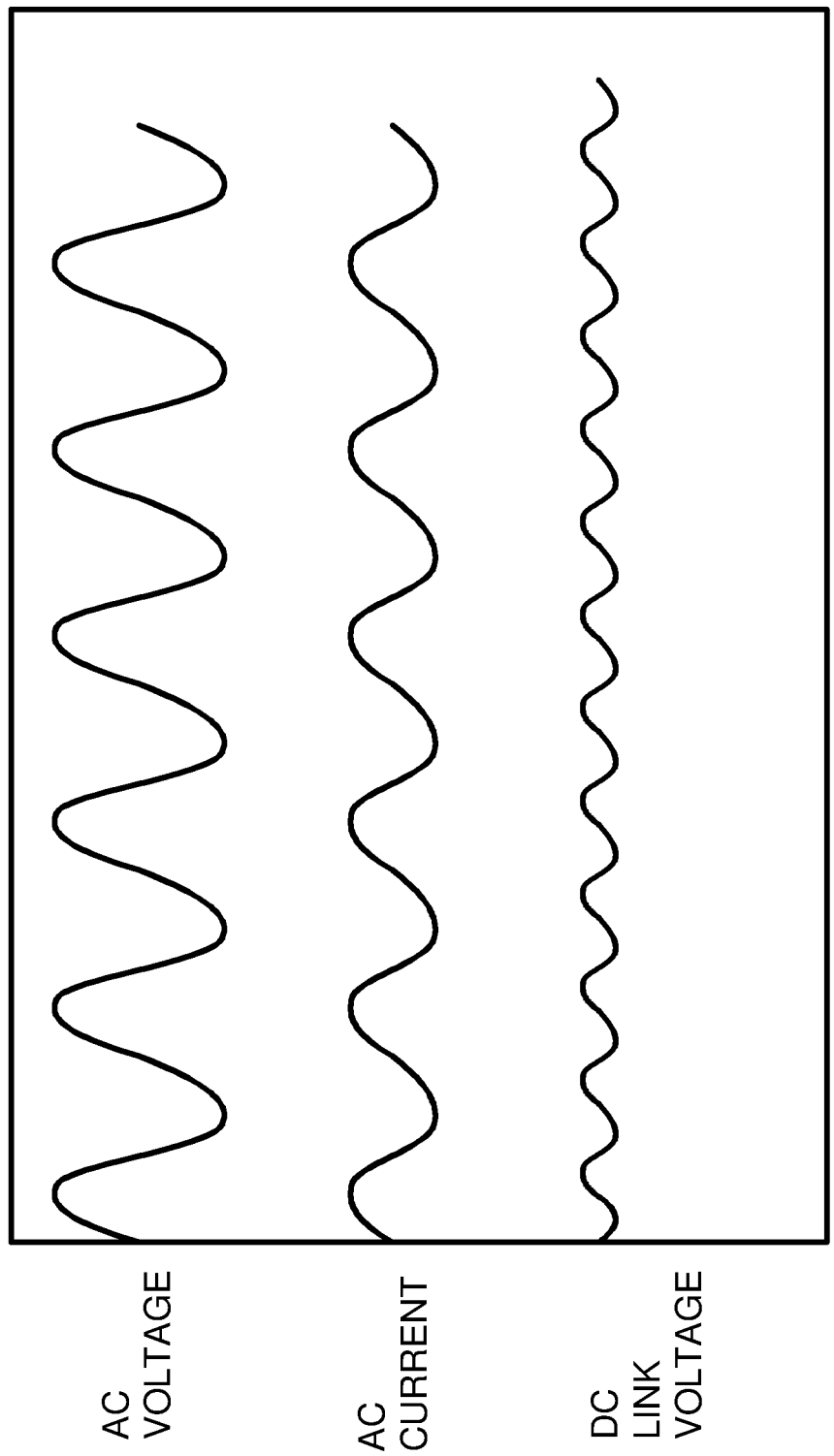
FIG. 17 is a plot of the smart power hub operating in single-phase AC charging mode.

FIG. 17 is a plot of the smart power hub operating in single-phase AC charging mode. The AC input has a sine wave for the AC voltage and the AC current measured on input A/P. The DC link voltage fluctuates with the AC input, but the fluctuations are very small. For example, when the AC input voltage is +/−300 volts, the peak AC current is 20 A, and the DC link voltage is 380 volts +/− 12 volts. So the fluctuation on the DC link voltage is 24/380, or about 6%. Total Harmonic Distortion (THD) is low. The AC current is in-phase with the AC voltage and operating with totem pole power factor correction control.

Figure 18:
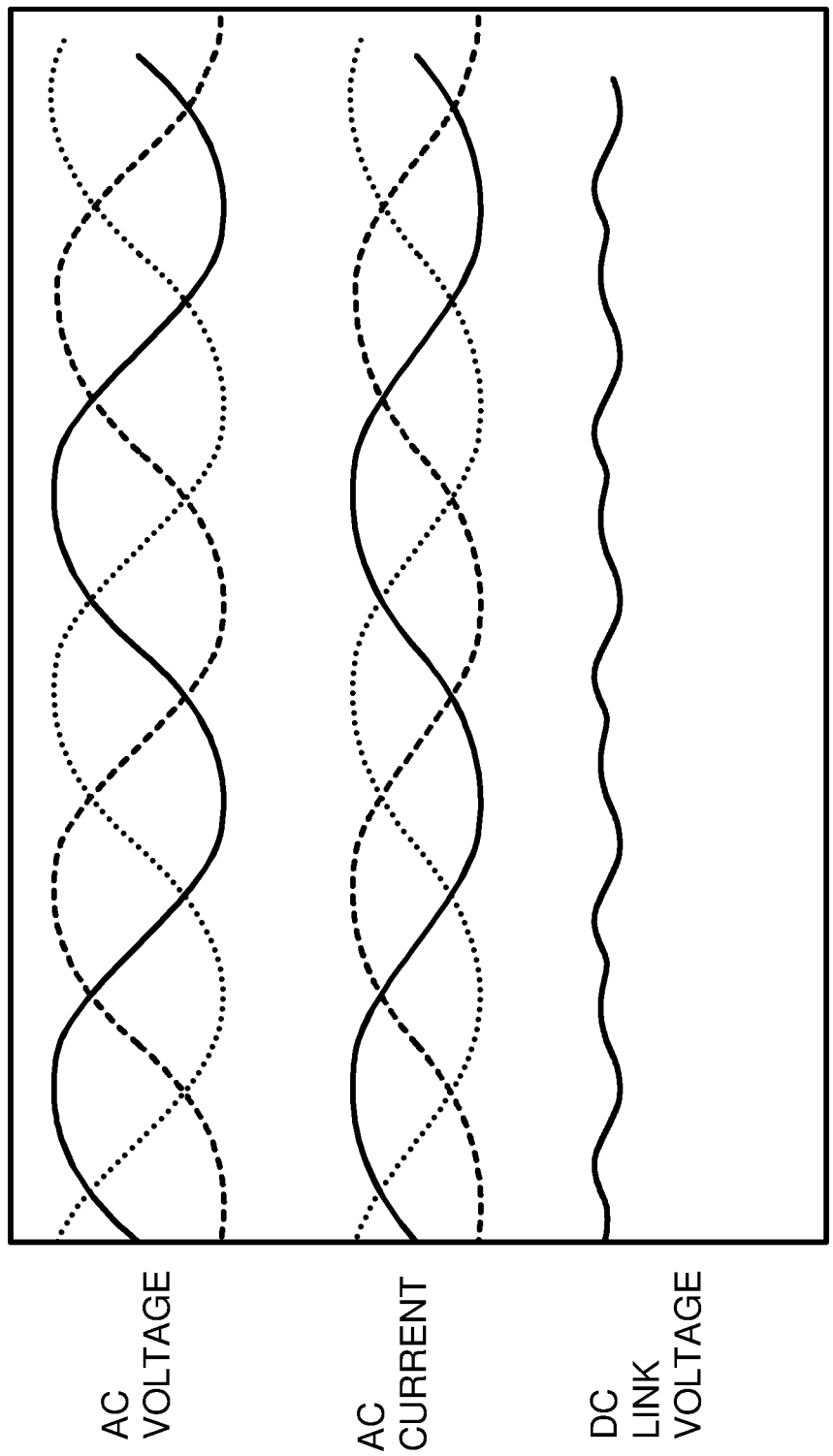
FIG. 18 is a plot of the smart power hub operating in three-phase AC charging mode.

FIG. 18 is a plot of the smart power hub operating in three-phase AC charging mode. The AC input has three sine waves, for the A, B, and C AC inputs. These sine waves are separated in phase by 120 degrees. The AC current is in-phase with the AC voltage for each of the 3 inputs. Each sine wave alternates in voltage from −300 volts to +300 volts, with the current alternating from −20 A to +20 A. AC bi-directional converter 150 is operating with space vector PWM control with a low THD. The input AC current is almost in phase with the input AC voltage.

The DC link voltage fluctuates with the three AC inputs, but the fluctuations are very small. For example, when the AC input voltage is +/−300 volts, the DC link voltage fluctuates from about 649.9 volts to 650.2 volts. So the fluctuation or ripple on the DC link voltage is 0.3/650, or about 0.05%.

Figure 19A:
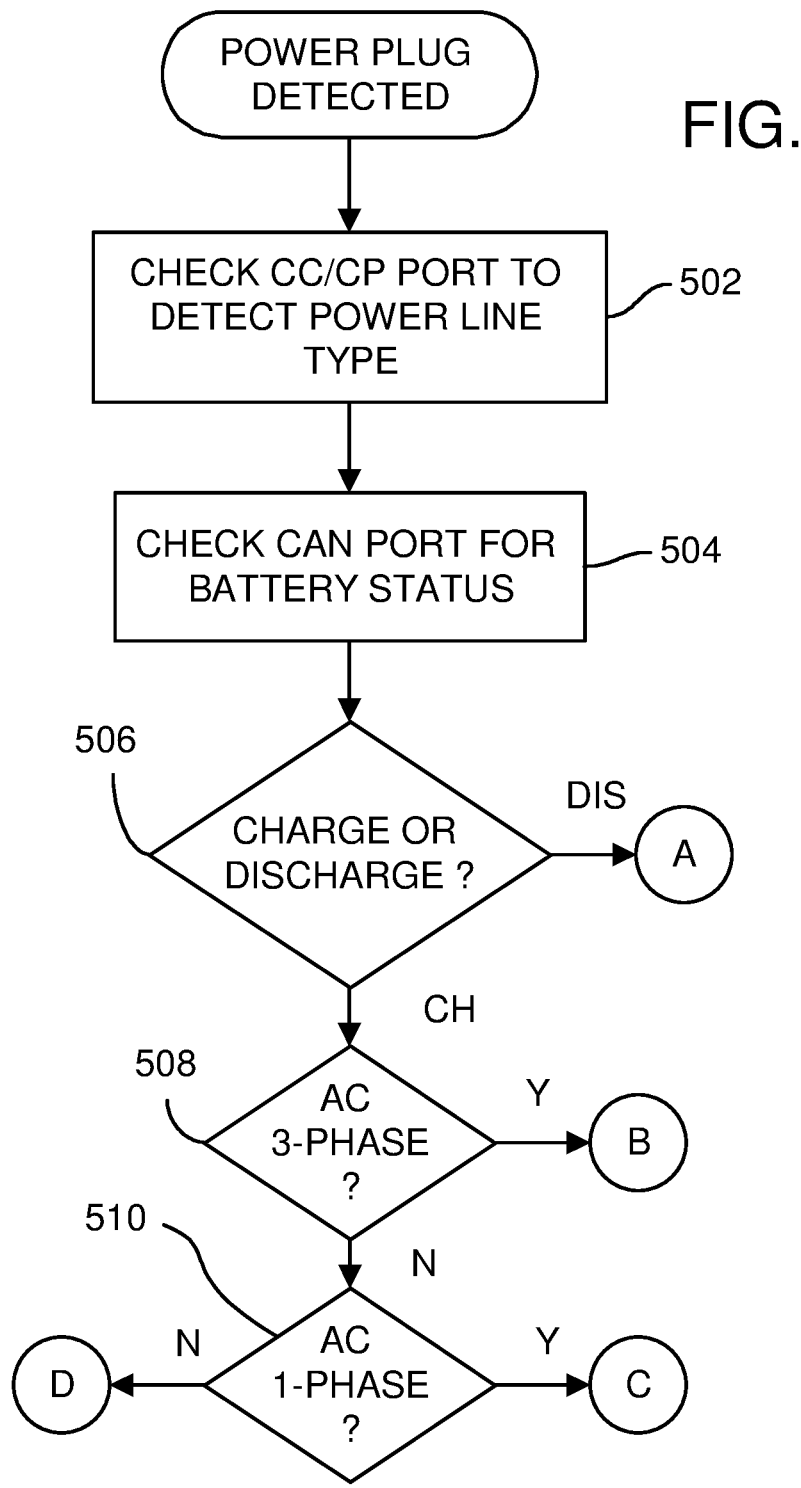

FIGS. 19A-19I is a flowchart of mode selection and configuration of the smart power hub. In FIG. 19A, when the smart power hub detects that a power plug has been inserted, the configuration routine is initiated. This routine can also be performed periodically. The Charging Connection confirmation/Control Pilot (CC/CP) port is checked to determine the power-line type for the AC port, such as for three-phase or one-phase AC power, step 502. The Controller Area Network (CAN) port is read for the battery status, step 504.

Figure 19B:
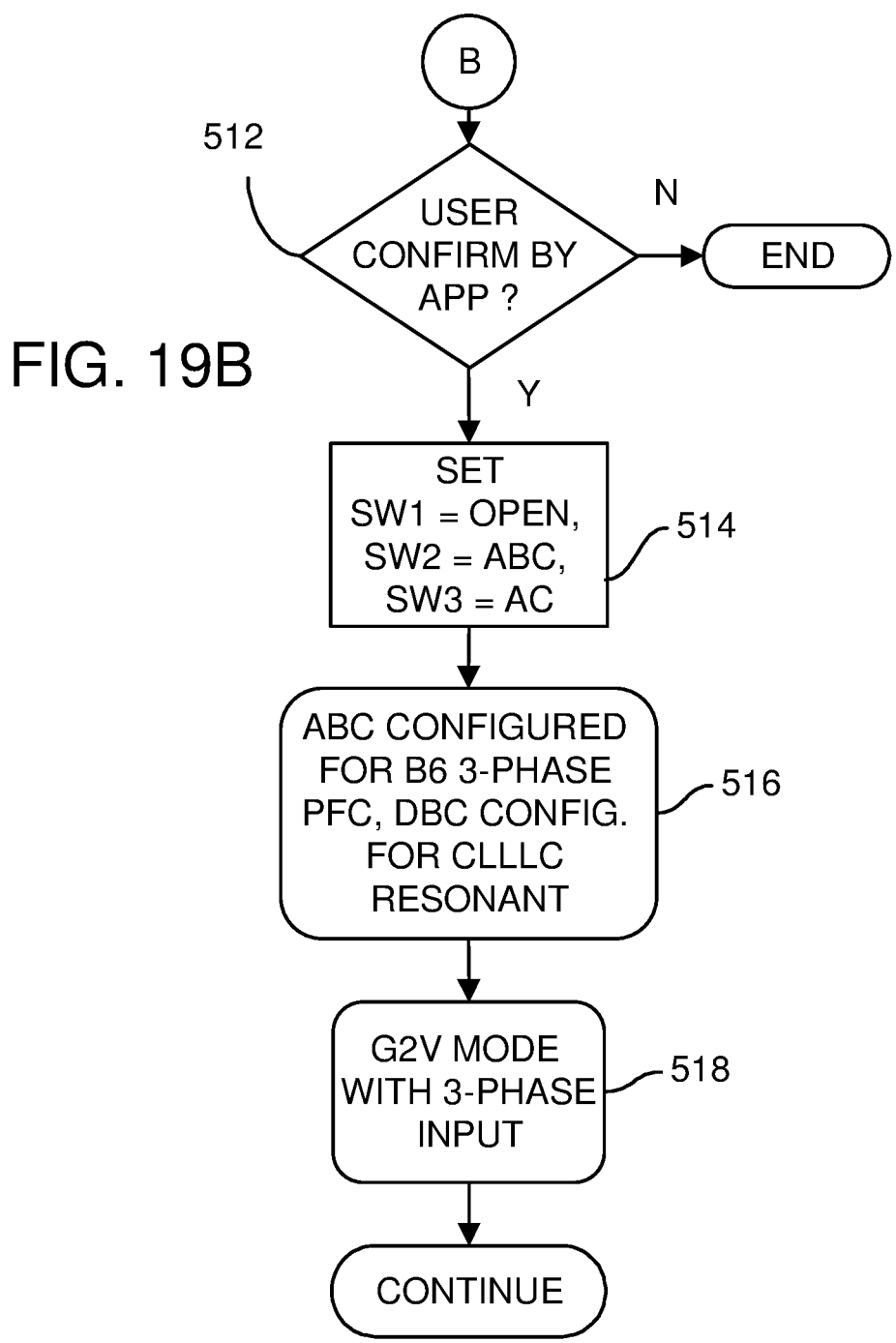

When charging is selected, such as by the battery status, step 506, and the CC/CP port indicates that 3-phase AC is available, step 508, then the G2V mode with 3-phase charging is selected and the process continues in FIG. 19B.

Figure 19C:
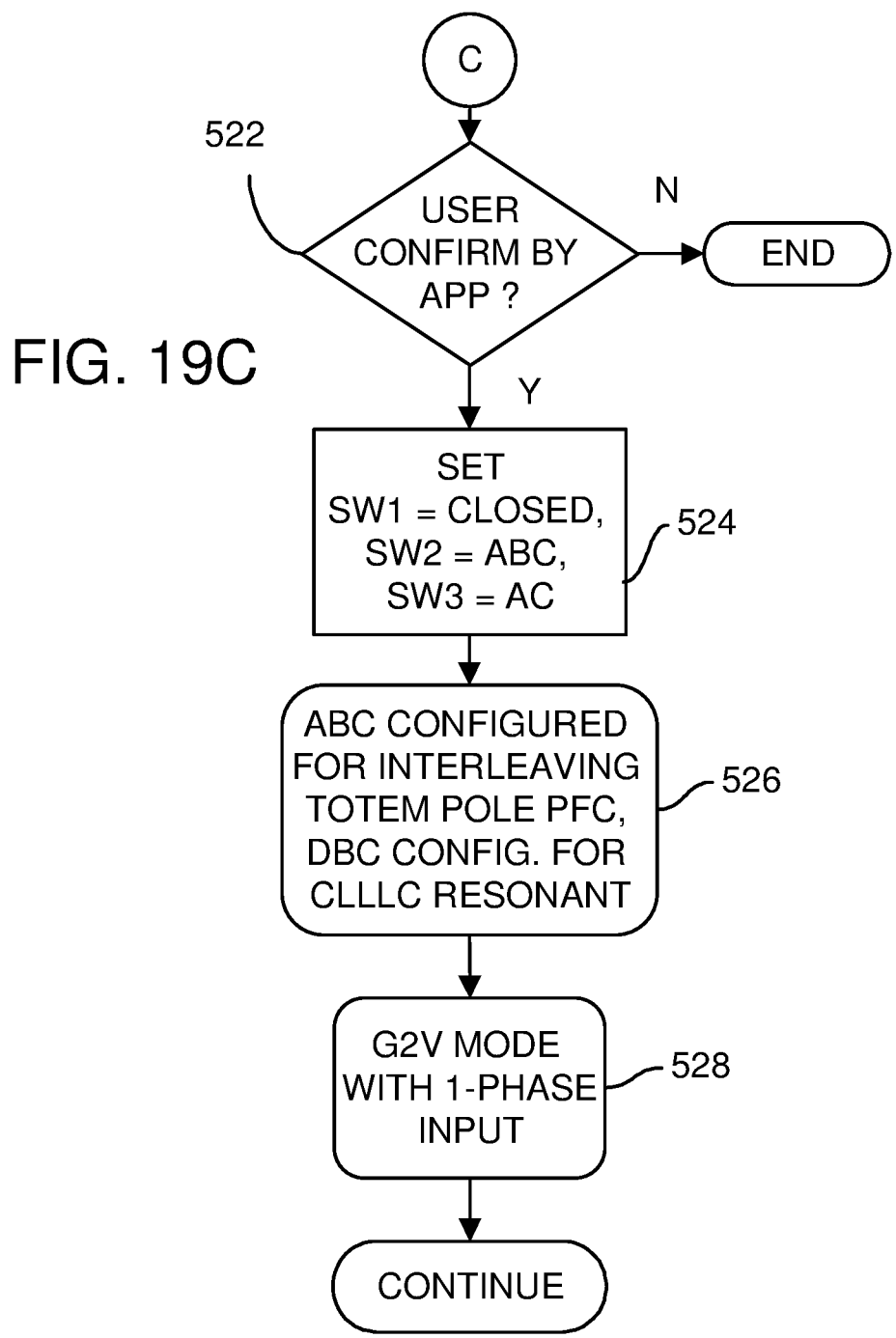

When charging is selected, step 506, and the CC/CP port indicates that 3-phase AC is not available, step 508, but 1-phase AC is available, step 510, then the G2V mode with 1-phase charging is selected and the process continues in FIG. 19C.

Figure 19D:
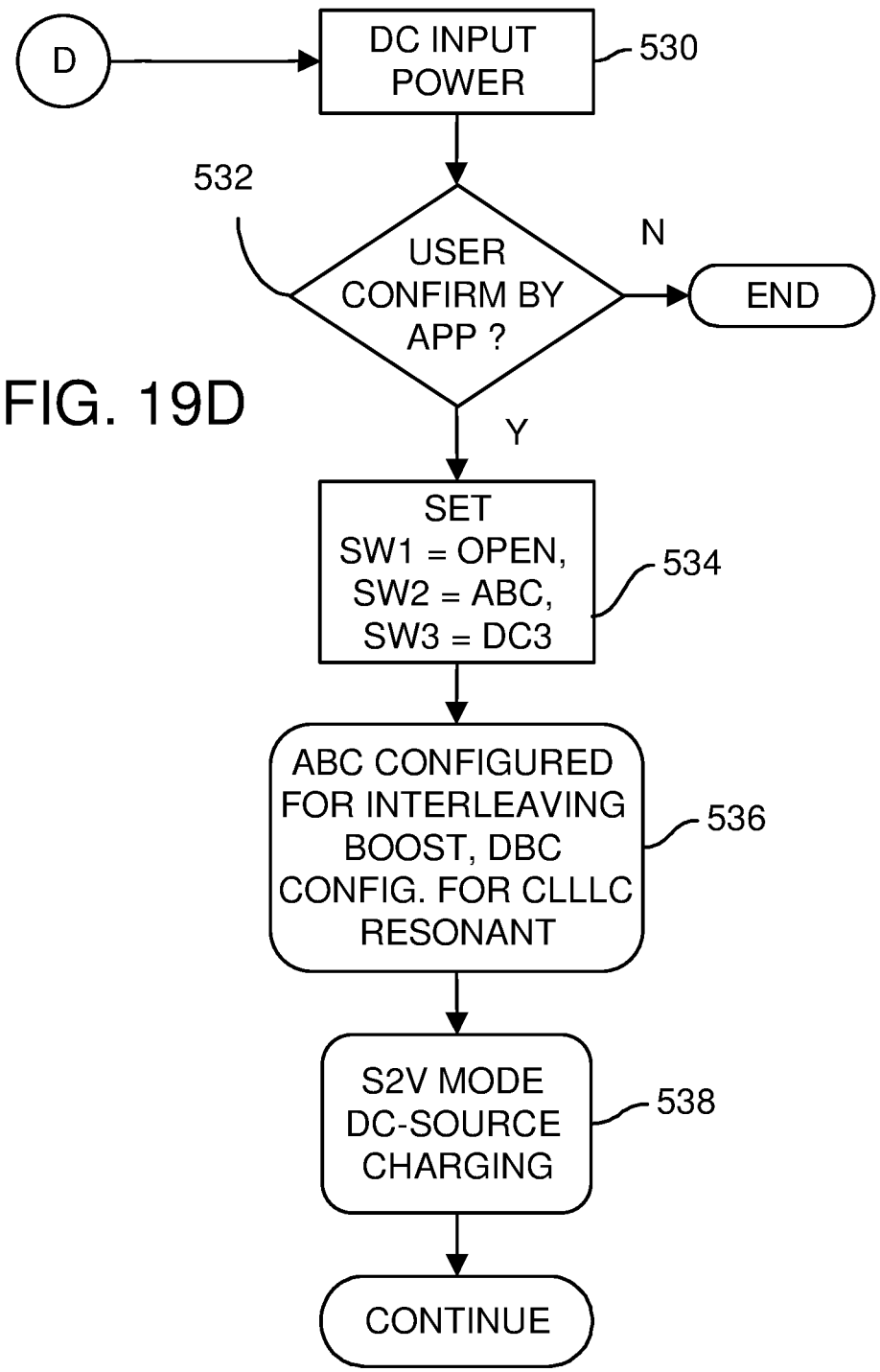

When charging is selected, step 506, but the CC/CP port indicates that neither 3-phase AC is available, step 508, nor 1-phase AC, step 510, then the S2V mode is selected and the process continues in FIG. 19D.

When discharge is selected, step 506, then the process continues in FIG. 19E.

In FIG. 19B, charging is selected and 3-phase AC is available. When the user confirms the use of G2V mode using an app, step 512, then the switches are configured, step 514. ABC digital controller 152 sets switch SW1 to open to allow all 3 AC inputs to feed into AC bi-directional converter 150 and sets switch SW3 to convert the AC signal to the DC link voltage. DBC digital controller 162 sets switch SW2 to close the primary windings 52 loop to select the DC link voltage from the ABC, AC bi-directional converter 150. AC bi-directional converter 150 (ABC) is configured for B6 3-phase Power-Factor-Correction (PFC), while DC bi-directional converter 160 (DBC) is configured for CLLLC resonant power converter mode, step 516. Smart power hub 120 operates in G2V mode with a 3-phase AC input, step 518.

In FIG. 19C, charging is selected and 1-phase AC is available. When the user confirms the use of G2V mode using an app, step 522, then the switches are configured, step 524. ABC digital controller 152 sets switch SW1 to closed to short the A/P and B AC inputs together to feed into AC bi-directional converter 150 and sets switch SW3 to convert the AC signal to the DC link voltage. DBC digital controller 162 sets switch SW2 to close the primary windings 52 loop to select the DC link voltage from the ABC, AC bi-directional converter 150. AC bi-directional converter 150 (ABC) is configured for B6 3-phase Power-Factor-Correction (PFC), while DC bi-directional converter 160 (DBC) is configured for CLLLC resonant power converter mode, step 526. Smart power hub 120 operates in G2V mode with a 1-phase AC input, step 528.

In FIG. 19D, charging is selected, but the CC/CP port indicates that neither 3-phase nor 1-phase AC is available. S2V mode is selected. When DC input power is available, step 530, and the user confirms using solar to charge the battery through his app, step 532, then the switches are configured, step 534. ABC digital controller 152 sets switch SW1 to open and sets switch SW3 to convert the DC signal from the solar panels on port DC3 to the DC link voltage. DBC digital controller 162 sets switch SW2 to close the primary windings 52 loop to select the DC link voltage from the ABC, which is mostly being bypassed by SW3 selecting port DC3 rather than the AC port.

ABC is configured for interleaving boost, but is bypassed since port DC3 is selected by switch SW3 rather than AC, while the DBC is configured for CLLLC resonant power converter mode, step 536. Smart power hub 120 operates in S2V mode with primary battery 132 being charged from the DC generated by solar panels 112 through DC plug 116 (FIG. 4), step 538. No conversion of the solar power to AC is performed, since the solar-generated DC is applied through port DC3 directly to the DC link voltage on link capacitor 168.

In FIG. 19E, discharge is selected. If the battery voltage is less than 200 volts, step 602, then the battery charge is too low and the process ends. Otherwise, when the battery voltage of primary battery 132 is more than 200 volts and DC loads 138 is connected, step 604, then V2L mode is selected to generate auxiliary power to on-board instruments as shown in FIG. 19F.

Figure 19F:
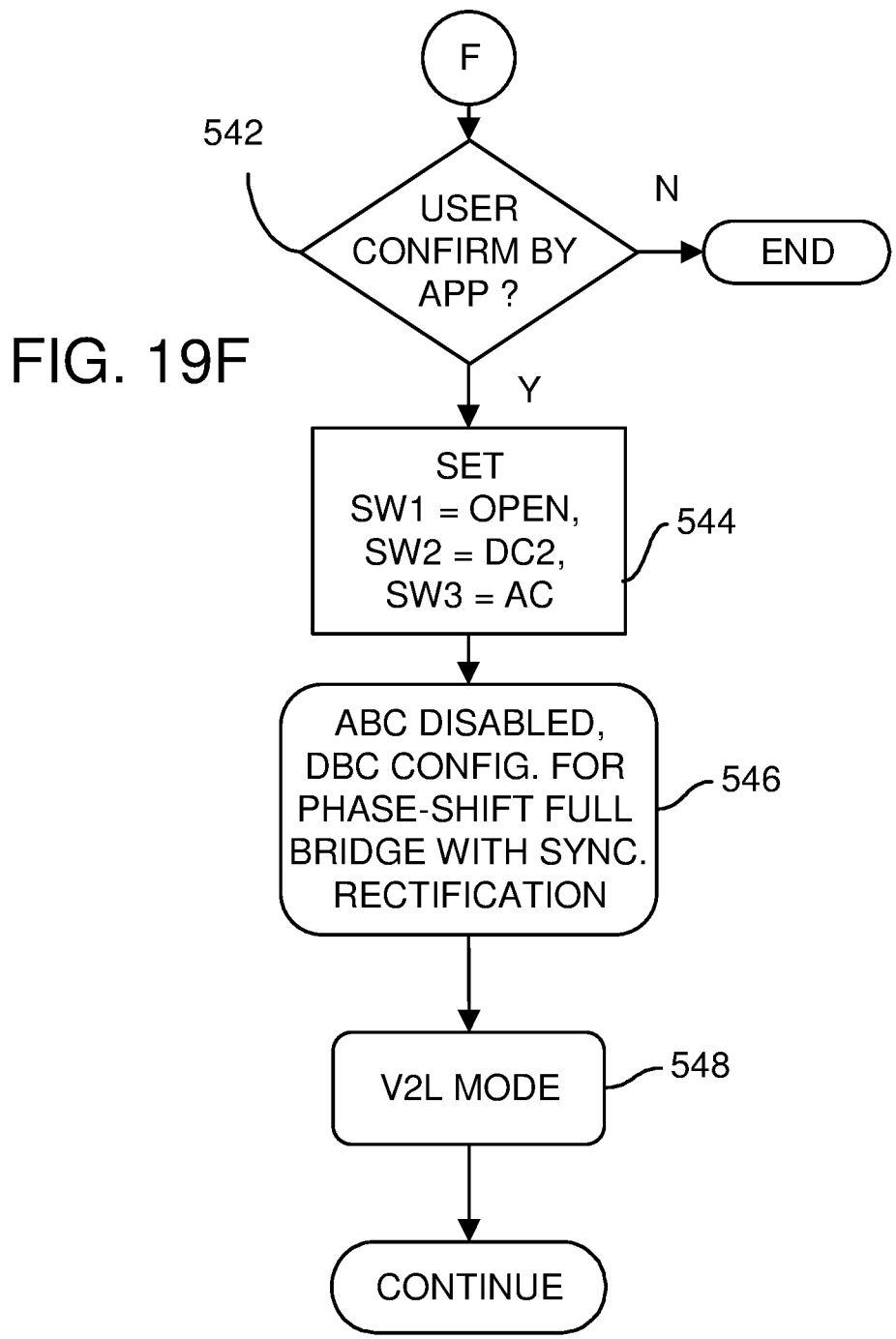
Figure 19G:
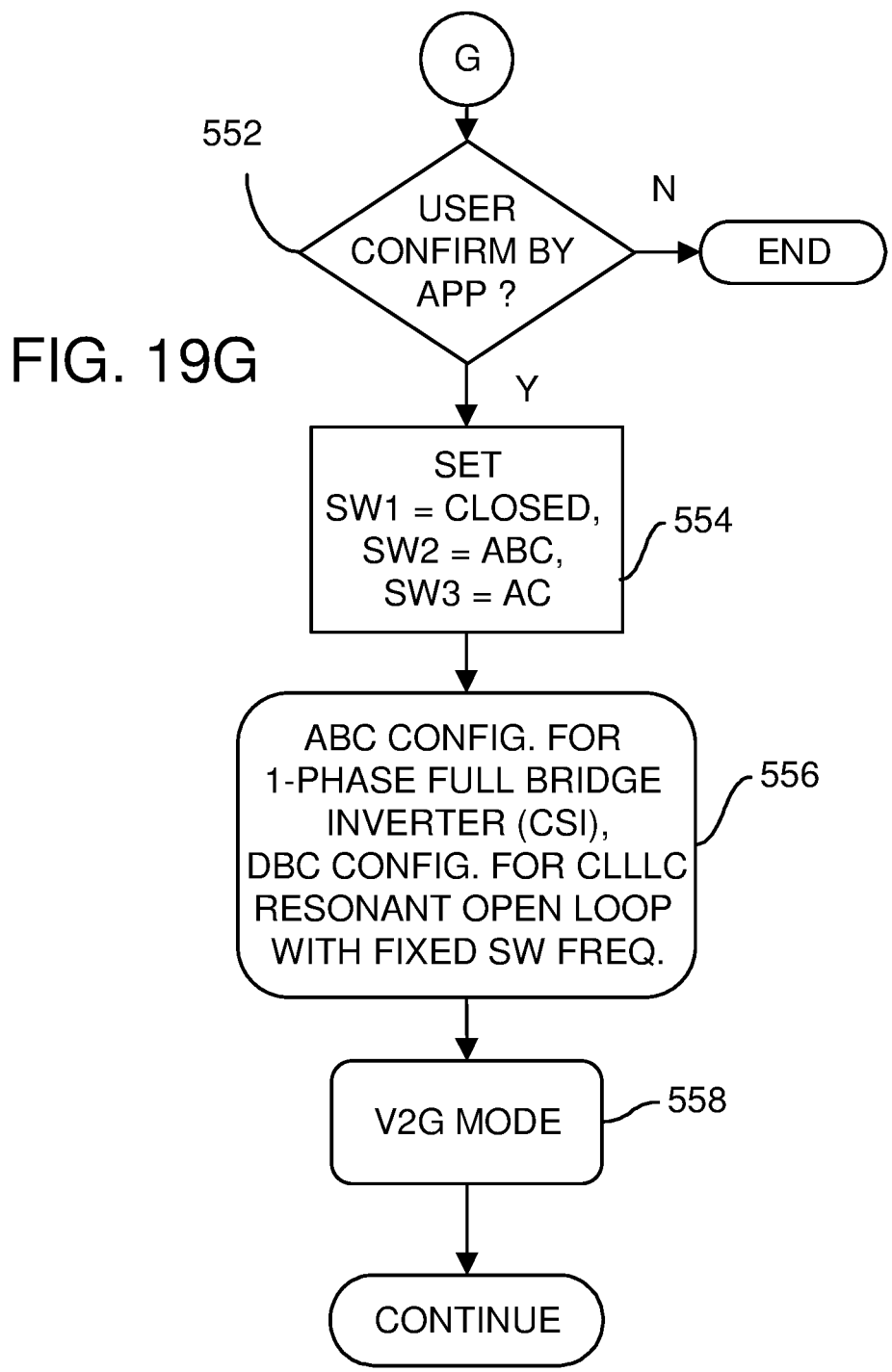

When the battery voltage is over 300 volts, step 606, and the AC grid can accept energy from primary battery 132, step 608, then V2G mode is selected as shown in FIG. 19G.

Figure 19H:
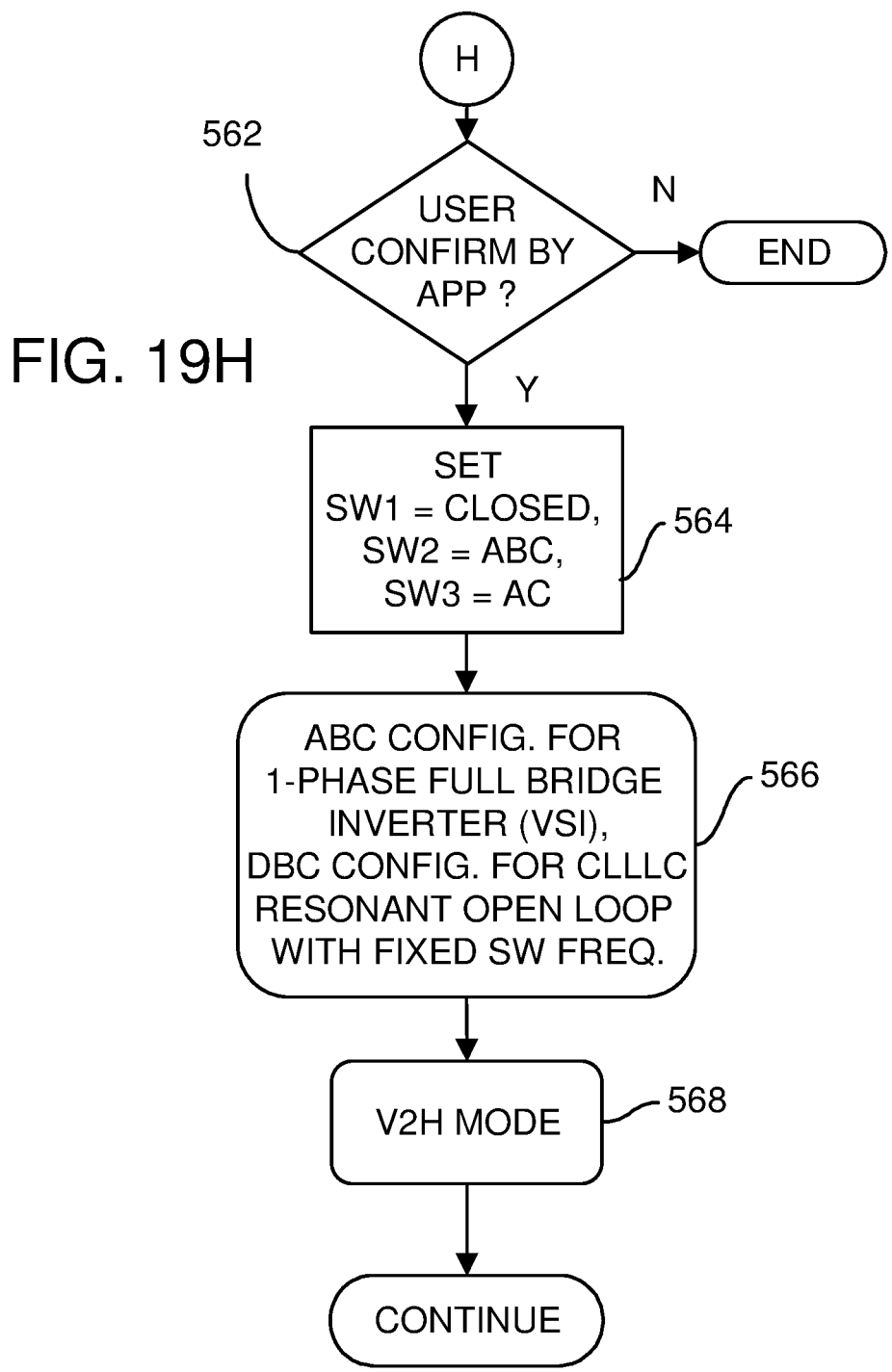

When the battery voltage is over 300 volts, step 606, but the AC grid cannot accept energy from primary battery 132, step 608, and AC loads such as AC appliances are able to be powered from the EV battery, step 610, then V2H mode is selected as shown in FIG. 19H. Otherwise V2V mode is selected to charge one EV battery from another EV battery, if present, and the process continues in FIG. 19I.

In FIG. 19F, V2L mode was selected to generate auxiliary power to on-board instruments. When the user confirms auxiliary power mode through his app, step 542, then the switches are configured, step 544. ABC digital controller 152 sets switch SW1 to open and sets switch SW3 to the DC2 port, however, the ABC is disabled so these settings don't matter. DBC digital controller 162 sets switch SW2 to DC2 to open the primary windings 52 loop and close the auxiliary windings 56 loop. This disconnects the DC link voltage and instead converts the DC2 voltage through transformer 50.

The ABC is disabled, while the DBC is configured as a phase-shift full bridge with synchronous rectification, step 546. Smart power hub 120 operates in V2L mode with primary battery 132 being charged from secondary battery 134 on the DC3 port, step 548. No conversion of the battery power to AC is performed.

In FIG. 19G, V2G mode was selected to drive the AC grid using primary battery 132. When the user confirms V2G mode through his app, step 552, then the switches are configured, step 554. ABC digital controller 152 sets switch SW1 to closed to short the B and A/P AC lines together, and sets switch SW3 to AC. DBC digital controller 162 sets switch SW2 to ABC to close the primary windings 52 loop. Both the ABC and the DBC operate in a reverse direction.

The ABC is configured as a single-phase full bridge inverter, while the DBC is configured as a CLLLC resonant open-loop power converter with a fixed switching frequency, step 556. Smart power hub 120 operates in V2G mode with primary battery 132 powering the DBC and ABC in reverse to generate AC to power the AC grid, step 558.

In FIG. 19H, V2H mode was selected to power AC loads such as AC appliances from the EV battery. When the user confirms V2H mode through his app, step 562, then the switches are configured, step 564. ABC digital controller 152 sets switch SW1 to closed to short the B and A/P AC lines together, and sets switch SW3 to AC. DBC digital controller 162 sets switch SW2 to ABC to close the primary windings 52 loop. Both the ABC and the DBC operate in a reverse direction.

The ABC is configured as a single-phase full bridge inverter, while the DBC is configured as a CLLLC resonant open-loop power converter with a fixed switching frequency, step 566. Smart power hub 120 operates in V2H mode with primary battery 132 powering the DBC and ABC in reverse to generate AC to power to drive AC home appliances, step 568. These AC appliances can be unplugged from the AC grid and plugged into a home charging port that connects to smart power hub 120.

Figure 19I:
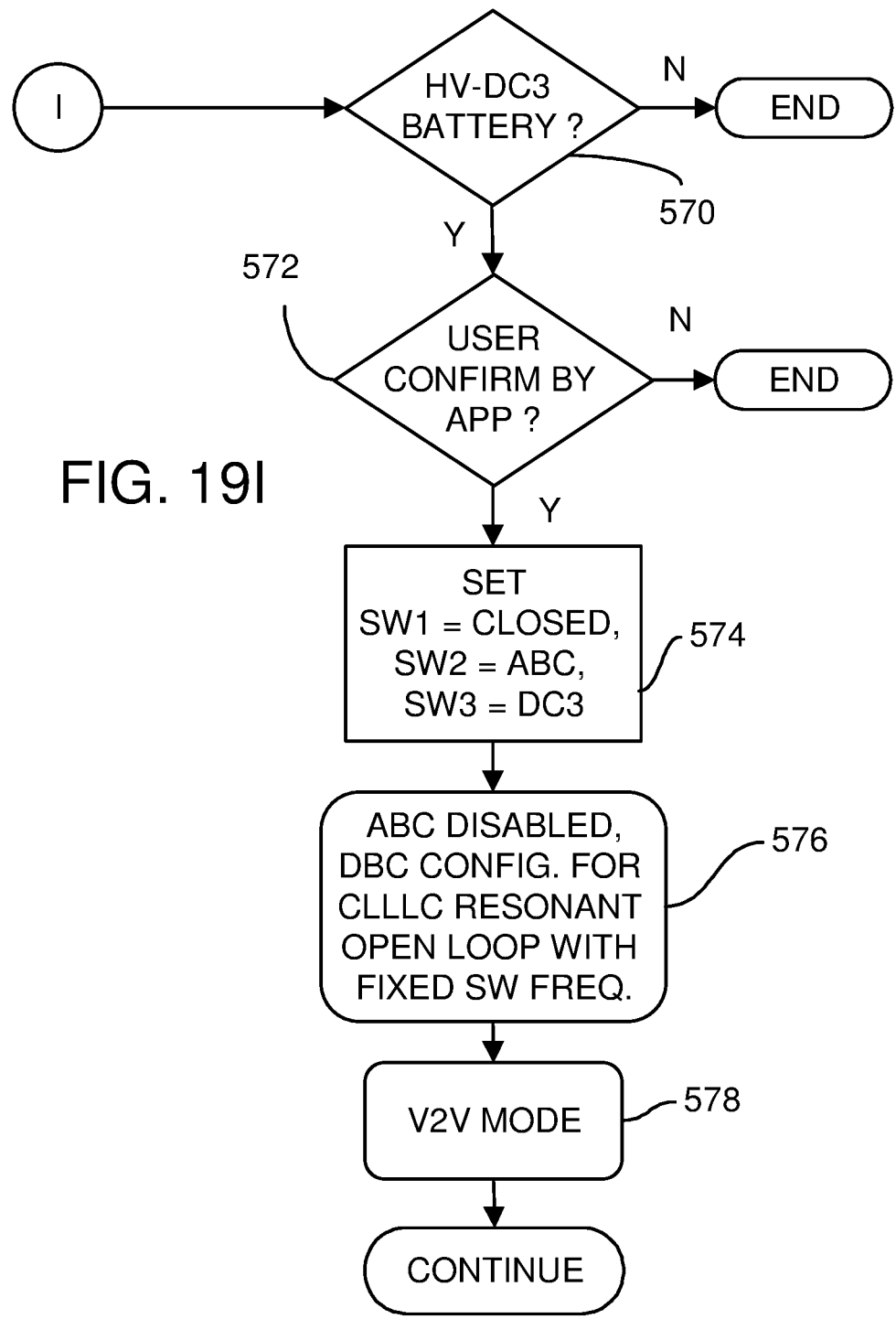

In FIG. 19I, V2V mode was selected to charge one EV battery from another EV battery, if present. If secondary battery 134 is not installed to port DC3, step 570, then the process ends. The process also ends if the use does not confirm the mode through his app, step 572.

When the user confirms V2V mode through his app, step 572, then the switches are configured, step 574. ABC digital controller 152 sets switch SW1 to closed to short the B and A/P AC lines together, and sets switch SW3 to DC3. DBC digital controller 162 sets switch SW2 to ABC to close the primary windings 52 loop.

The ABC is disabled, while the DBC is configured as a CLLLC resonant open-loop power converter with a fixed switching frequency, step 576. Smart power hub 120 operates in V2V mode with secondary battery 134 on port DC3 charging primary battery 132 on port DC1. When primary battery 132 is charged and secondary battery 134 has a low charge, DC bi-directional converter 160 can be operated in reverse to charge secondary battery 134, step 578.

ALTERNATE EMBODIMENTS

Several other embodiments are contemplated by the inventors. For example, pull-up transistor 220 and pull-down transistor 222 can both be n-channel transistors, or pull-up transistor 220 could be a p-channel transistor and pull-down transistor 222 could be an n-channel transistor, with the gate voltages inverted to account for the inherent p-channel inversion of logic. Other transistors could likewise all be n-channel or could have p-channel pull-ups.

While a user app has been described to confirm the mode of operation of smart power hub 120, the user could also confirm the mode using an interface on the charger, plug, cable, a display/interface in the EV, on his smart phone, or by other means. Alternately, smart power hub 120 could operate without confirmation from the user, especially for some simpler modes. More complex or less-frequently used modes could require user confirmation while frequently used modes could operate without user confirmation. Confirmation could also be provided by an operating system on the EV, or by other sensors or devices.

The solar panels create a DC current from sunlight using photovoltaic cells or similar photo-sensitive technology. The solar DC current from the panels can be modified, such as by transforming the DC voltage or filtering the solar DC current but is not converted to AC before being applied to port DC3.

While secondary battery 134 has been shown as being connected to port DC3, port DC3 could connect to secondary battery 134 through another smart power hub. Port DC3 could be a hub-to-hub port or have a hub-to-hub mode. The two smart power hubs could communicate with each other, such as through an Internet connection or through the user app, or directly with a communication line in a cable.

Additional ports could be added, and additional switches used to connect to these additional ports. For example, the AC home appliances could be placed on a new AC port rather than share the AC port, or an additional switch could be placed on the AC port to switch between the AC grid and AC appliances. Rather than use port DC3 for solar and for secondary battery 134, there could be an additional switch on port DC3 for selecting among solar and secondary battery 134. Some embodiments of smart power hub 120 may have fewer than the four ports described herein.

Switches could be power relays or could be transistor switches or transmission gates. During charging mode, the DC link voltage is controlled by the ABC digital controller to try to match changes to the primary battery voltage. The DBC is operating in PFM. Thus during charging mode, ABC is operating at PWM and DBC is operating at PFC with an adaptive DC link voltage which can support a wide battery voltage range for DC1. During discharging mode, the DBC's switching frequency is fixed at the resonant frequency. The DC link voltage is variable and non-regulated, and the ABC controller is used to regulate the AC output current or voltage.

While a smart power hub onboard an EV has been described, the smart power hub could be located at the home, can be a mobile EV charger, or can be a portable EV charger without being on-board an EV. Smart power hub 120 could be divided into a portion that is on-board the EV and another portion that is at the home charger station. Smart power hub 120 could be used for purposes other than EV's, such as for backup power systems, powering industrial or medical equipment. Smart power hub 120 can also be a renewable energy storage system. During power grid rush hour, the battery can be discharged to provide energy to the grid, while during low demand times, the battery can be charged from energy from the grid or from a solar panel. Thus is can provide peak power leveling for the power grid's stability and security.

While an EV has been described, the EV could have both an electric engine and an internal combustion engine that burns gasoline, such as for a pug-in hybrid car or EV. The EV could have a second engine that burns gasoline to charge the battery, while having an electric engine for the drive train. The EV can have its own power sources, such as regenerative brakes, and these power sources could directly charge the EV battery, bypassing smart power hub 120, or could connect to a port on smart power hub 120.

The DC link voltage can rise with the battery voltage over a limited range and can be relatively constant when outside of that operating range. The switching frequency can be considered to be equal to the resonant frequency when they are within a desired range, such as within an order of magnitude, or within 10%. Efficiency is highest when the switching frequency is exactly equal to the resonant frequency, but variances in inductances and capacitances and other circuit features and layouts can make exact matching unreasonable or unrealistic, so matching within a range such as an order of magnitude can be considered a match.

The operation of ABC digital controller 152 and DBC digital controller 162 that are shown by the control loops in FIGS. 10, 11, 13, and 14 could be implemented in various ways and with many variations. Operations may be combined or re-ordered or skipped. Hardware, firmware, software, or various combinations thereof may be used. Timings and phase differences may be adjusted. Some steps may be re-sequenced in other sequences.

More complex logic and control trees could be added to the control loops, such as to add disabling transistors to disable operation, such as for power-down modes. Filters could be added to various nodes, such as by adding capacitors, resistors, inductors, or networks of resistors, capacitors and inductors. Leaker resistors could be added. Parasitic capacitances and resistances may be present. Hysteresis could be added for more complex waveform shaping. Buffers could be added between stages, or more stages or dummy stages could be added. The auxiliary windings may not be present in some embodiments, and some embodiments may have more than 3 sets of windings, or in different polarities and configurations.

Different transistor, capacitor, resistor, and other device sizes can be used, and various layout arrangements can be used, such as multi-leg, ring, doughnut or irregular-shape transistors. Additional taps, guard rings, transistors, and other components may be added.

The PWM control signals have been described as having 180-degree phase separations. It is understood that these are ideal phase values, and that actual phases may vary somewhat, such as +/−5%, 10%, etc., and still be considered to have 180-degree phase separation.

Currents can be positive or negative currents and flow in either direction. Many second and third order circuit effects may be present and may be significant, especially for smaller device sizes. A circuit simulation may be used to account for these secondary factors during design.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A smart power hub comprising:
    an Alternating Current (AC) port for connecting to an AC power grid;
    a first Direct Current (DC) port for connecting to a primary battery;
    a second DC port for connecting to DC devices that are powered through the second DC port;
    a link capacitor having a DC link voltage on a link node;
    an AC converter, coupled to the AC port, for converting AC power from the AC power grid to the DC link voltage on the link node when connected to the link capacitor and operating in an AC power mode;
    a DC Bi-directional Converter (DBC) that receives the DC link voltage from the link capacitor, for converting the DC link voltage to a battery voltage on the first DC port when charging the primary battery from the AC power grid, and for converting the battery voltage to a DC load voltage on the second DC port when powering the DC devices by discharging the primary battery;
    an AC digital controller that configures and controls the AC converter, the AC digital controller generating Pulse-Width-Modulation (PWM) control signals to gates of transistors in the AC converter, wherein the AC digital controller generates PWM control signals with a duty cycle that is increased as the DC link voltage rises; and
    a DBC digital controller that configures and controls the DC bi-directional converter, the DBC digital controller generating Pulse-Frequency-Modulation (PFM) control signals to gates of transistors in the DC bi-directional converter, wherein the DBC digital controller generates PFM control signals with a switching frequency that is reduced as the battery voltage rises, and the switching frequency is increased as the battery voltage falls;
    wherein the DBC digital controller generates the PFM control signals with a fixed switching frequency equal to a resonant frequency of the DC bi-directional converter when the primary battery is being discharged, whereby switching frequency in the DC bi-directional converter is reduced as the battery voltage rises and is increased as the battery voltage falls during battery charging and fixed at the resonant frequency during battery discharging with the DC link voltage being variable.

2. The smart power hub of claim 1 wherein the DC link voltage rises as the battery voltage rises when the primary battery is being charged;
    wherein the DC link voltage is not a fixed voltage during battery charging, the DC link voltage being a variable voltage that rises with the battery voltage during charging;
    wherein a duty cycle of the PWM control signals generated by AC digital controller is increased as the DC link voltage increases as the battery voltage of the primary battery rises during charging.

3. The smart power hub of claim 1 wherein the AC port further comprises:
    an A/P line for connecting to a P line for one-phase AC power, and for connecting to an A line for three-phase AC power;
    a B line for connecting to a B line for three-phase AC power;
    a C/N line for connecting to an N line for one-phase AC power, and for connecting to a C line for three-phase AC power;
    wherein the A, B and C lines each carry an AC wave that is separated from AC waves on others of the A, B, and C lines by a 120-degree phase;
    a first switch for shorting the B line to the A/P line when the AC port receives one-phase AC power, and for isolating the B line from the A/P line when the AC port receives three- phase AC power;
    wherein the AC converter further comprises:
    a first series inductor connecting the A/P line to an A node;
    an A upper transistor having a gate to control current conduction between the A node and an upper node;
    an A lower transistor having a gate to control current conduction between the A node and a ground node;
    a second series inductor connecting the B line to a B node;
    a B upper transistor having a gate to control current conduction between the A node and the upper node;
    a B lower transistor having a gate to control current conduction between the A node and the ground node;
    a third series inductor connecting the C/N line to a C node;
    a C upper transistor having a gate to control current conduction between the A node and the upper node;
    a C lower transistor having a gate to control current conduction between the A node and the ground node;
    wherein the upper node is connected to an upper terminal of the link capacitor when charging the primary battery from the AC power grid;
    wherein a lower terminal of the link capacitor is connected to the ground node.

4. The smart power hub of claim 1 wherein the DC bi-directional converter further comprises:
    a transformer having primary windings, secondary windings, and auxiliary windings;
    a primary bridge receiving the DC link voltage and driving the primary windings of the transformer through a capacitor and an inductor in series with the primary windings;
    a secondary bridge connected to the battery voltage from the first DC port, the secondary bridge driving the secondary windings of the transformer through a capacitor and an inductor in series with the secondary windings when the primary battery is being discharged;

an auxiliary rectifier receiving an inductive current from the auxiliary windings when the primary battery is being discharged to power the DC devices on the second DC port, the auxiliary rectifier generating a second DC voltage on the second DC port to power the DC devices;

a second switch that opens a current loop through the primary windings and closes a current loop through the auxiliary windings when primary battery is being discharged to power the DC devices on the second DC port, the second switch closing the current loop through the primary windings and opening the current loop through the auxiliary windings when primary battery is being charged from the AC power grid or from a solar panel, wherein the DC bi-directional converter operates as a CLLLC resonant power converter when charging the primary battery.

5. The smart power hub of claim 4 wherein the primary bridge further comprises:
a first upper primary transistor having a gate for controlling current between the link node and a first primary node;
a second upper primary transistor having a gate for controlling current between the link node and the first primary node;
a first lower primary transistor having a gate for controlling current between the ground node and a second primary node;
a second lower primary transistor having a gate for controlling current between the ground node and the second primary node;
wherein the first primary node and the second primary node drive the current loop through the primary windings of the transformer through the capacitor and the inductor in series with the primary windings.

6. The smart power hub of claim 5 wherein the secondary bridge further comprises:
a first upper secondary transistor having a gate for controlling current between the first DC port having the battery voltage and a first secondary node;
a second upper secondary transistor having a gate for controlling current between the first DC port having the battery voltage and the first secondary node;
a first lower secondary transistor having a gate for controlling current between a battery ground and a second secondary node;
a second lower secondary transistor having a gate for controlling current between the battery ground and the second secondary node;
wherein the first secondary node and the second secondary node drive the current loop through the secondary windings of the transformer through the capacitor and the inductor in series with the secondary windings when the primary battery is being discharged.

7. The smart power hub of claim 4 wherein the ABC digital controller further comprises:
a first control loop that receives the DC link voltage and the battery voltage and generates the PWM control signals as a function of the DC link voltage and the battery voltage;
a multiplier for multiplying the battery voltage by a turns ratio of a number of turns in the primary windings and a number of turns in the secondary windings;

wherein the ABC digital controller generates the PWM control signals to a first pair and to a second pair of transistors in the AC bi-directional converter to have a switching frequency that is at least double of an AC line frequency of the port, the ABC digital controller generating control signals to a third pair of transistors in the AC bi-directional converter to have a switching frequency equal to the AC line frequency.

8. The smart power hub of claim 7 wherein the DBC digital controller further comprises:
a second control loop that receives the battery voltage and generates the PFM control signals as a function of the battery voltage;
wherein the second control loop reduces the switching frequency as the battery voltage is increased during charging;
wherein the second control loop fixes the switching frequency to a resonant frequency of the DC bi-directional converter as the battery voltage is decreased during discharging.

9. The smart power hub of claim 1 further comprising:
a third DC port for connecting to a solar panel that generates a solar DC voltage from sunlight;
a third switch that during a solar mode, connects the third DC port to the link capacitor to apply the solar DC voltage to charge the link capacitor, the third switch disconnecting the AC converter from the link capacitor during the solar mode, wherein the third switch connects the AC converter to the link capacitor when not operating in the solar mode;
wherein the DC bi-directional converter converts the solar DC voltage applied to the link capacitor as the DC link voltage into the battery voltage on the first DC port to charge the primary battery from the solar panel without conversion of the solar DC voltage to a Alternating Current,
whereby the solar panel charges the primary battery without conversion to AC.

10. An Electric Vehicle (EV) smart power hub comprising:
an Alternating Current (AC) port for connecting to an AC power grid;
a first Direct Current (DC) port for connecting to a primary battery onboard the EV that powers a drive train of the EV;
a second DC port for providing auxiliary DC power to instruments onboard the EV;
an AC converter that converts AC applied to the AC port from the AC power grid to a DC link voltage during an AC grid to battery voltage (G2V) mode;
a DC bi-directional converter (DBC) that converts the DC link voltage from the AC converter to a battery voltage applied to the primary battery through the first DC port, the DBC converting the battery voltage applied to the first DC port from the primary battery to a DC load voltage applied to the second DC port when the DC bi-directional converter is operating in a battery voltage to load (V2L) mode;
an AC digital controller that configures the AC converter for operating modes including the G2V mode and that controls the AC converter to convert AC power to the DC link voltage during the G2V mode; and
a DBC digital controller that configures the DBC for operating modes including the G2V mode and the V2L mode, the DBC digital controller generating control signals to operate the DC bi-directional converter to convert the DC link voltage to the battery voltage during the G2V mode, and to convert the battery voltage to the DC link voltage during the V2L mode;
a link capacitor connected between the DC link voltage and a ground;
wherein the AC converter comprises six transistors arranged into three transistors pairs, each transistor pair having an input node between the transistors, the input node receiving one of three AC input lines on the AC port that carry three-phase AC, each pair of transistors having an upper transistor that connects to the DC link voltage and a lower transistor that connects to the ground;
wherein when the AC port connects to a three-phase AC power grid, the AC digital controller configures the AC converter to operate as a six-transistor three-phase rectifier and generates Pulse-Width-Modulation (PWM) control signals the six transistors in the AC converter to rectify three-phase AC power to generate the DC link voltage; and
a first switch that shorts a middle line of the three AC input lines to a first line of the three AC input lines when the AC port is connected to a single-phase AC grid;
wherein when the AC port connects to the single-phase AC power grid, the AC digital controller configures the AC converter to operate as an interleaving totem pole boost circuit by generating PWM control signals to the six transistors in the AC converter to rectify single-phase AC power to generate the DC link voltage;
a third DC port for connecting to an external DC power source;
a third switch that disconnects the AC converter from the DC bi-directional converter and connects the third DC port to the DC bi-directional converter during an external DC voltage to battery voltage (V2V) mode;
wherein a voltage of the external DC power source applied to the third DC port is the DC link voltage during the V2V mode;
wherein the DBC further comprises;
a transformer having primary windings and secondary windings;
a first bridge having four first bridge transistors connected as a bridge between the DC link voltage and the primary windings, the first bridge having a capacitor and an inductor in series with the primary windings;
a second bridge having four second bridge transistors connected as a bridge between the first DC port and the secondary windings, the second bridge having a capacitor and an inductor in series with the secondary windings;
wherein the DBC digital controller generates Pulse-Frequency-Modulation (PFM) control signals, the DBC digital controller applying the PFM control signals to gates of the four first bridge transistors in the DBC,and applying synchronous control signals to the four second bridge transistors, to operate the DBC to convert the DC link voltage to the battery voltage during the G2V mode;
wherein the DBC digital controller applies the PFM control signals to gates of the four second bridge transistors in the DBC,and applies the synchronous control signals to the four first bridge transistors, to operate the DBC to convert the battery voltage to the DC link voltage during the V2L mode;
wherein during the G2V mode, a switching frequency of the PFM control signals matches within an order of magnitude a resonant frequency of the DBC, the reso-nant frequency being a function of capacitance and inductance values of the capacitor and the inductor in series with the primary windings and of the capacitor and the inductor in series with the secondary windings;
wherein the battery voltage is sensed by the DBC digital controller to control the PFM control signals during the G2V mode, the DBC digital controller reducing a switching frequency of the PFM signals as the battery voltage and the DC link voltage increase during charging,
wherein EV smart power hub is located onboard the EV and is configured for operating modes including the G2V mode and the V2L mode.

11. The EV smart power hub of claim 10 wherein the external DC power source is a solar panel having photovoltaic cells that generate a solar DC current from sunlight;
wherein the solar DC current is not converted to an AC current, where the solar DC current is applied to the second DC port to generate the DC link voltage during a solar to battery voltage (S2V) mode;
wherein the primary battery is charged by the solar panel through the DC bi-directional converter without conversion of the solar DC current to an AC current between the solar panel and the primary battery.

12. The EV smart power hub of claim 10 wherein the external DC power source is a secondary battery;
wherein the secondary battery is connected through a smart power hub to the second DC port.

13. The EV smart power hub of claim 10 wherein the AC bi-directional converter and the DC bi-directional converter are configured to operate as a Current Source Inverter (CSI) in a Voltage-to-Grid (V2G) mode that discharges the primary battery to provide power to the AC grid through the AC port;
wherein the AC bi-directional converter and the DC bi-directional converter are configured to operate as a Voltage Source Inverter (VSI) in a Voltage-to-Home (V2H) mode that discharges the primary battery to provide power to AC appliances that are not connected to the AC grid.

14. A power hub comprising:
an Alternating Current (AC) port having three lines for carrying three-phase AC, the AC port also for receiving single-phase AC on a first line and on a third line of the three lines,
a first switch for connecting a second line of the three lines to the first line when the AC port receives single-phase AC, and for isolating the first line from the second line when the AC port receives three-phase AC;
an AC bi-directional converter (ABC) having three pairs of an upper transistor and a lower transistor, each pair receiving one of the three lines on a node connecting the upper transistor to the lower transistor;
an ABC digital controller that opens the first switch and that generates first Pulse-Width-Modulation (PWM) control signals to the upper and lower transistors, the first PWM control signals causing the ABC to operate as a three-phase AC rectifier with each pair of transistors rectifying one of three AC phases when three-phase AC is received,
when the three-phase AC is not received and the single-phase AC is received, the ABC digital controller closes the first switch to short together the first line and the second line from the AC port, the ABC digital controller generating the first PWM control signals to interleave operation of a first and second pair of the upper and lower transistors that connect to the first line and to second line that are connected together by the first switch, and operates a third pair of the upper and lower transistors that are connected to the third line at a line frequency of the single-phase AC;

a link capacitor having a ground terminal connected to the lower transistors and an upper terminal connected to the upper transistors, the upper terminal having a DC link voltage;

a first DC port for connecting to a primary battery;

a second DC port for connecting to a DC load;

a DC bi-directional converter (DBC) having a first bridge of first bridge transistors that receive the DC link voltage, and a second bridge of second bridge transistors that connect to the first DC port, and auxiliary transistors that connect to the second DC port, and a transformer with primary windings connected in a first loop with a first capacitor and a first inductor to the first bridge transistors, secondary windings connected in a second loop with a second capacitor and a second inductor to the second bridge transistors, and auxiliary windings connected in a third loop to the auxiliary transistors;

a second switch that opens and closes the first loop and opens and closes the third loop; and a DBC digital controller that operates the second switch and generates Pulse-Frequency-Modulation (PFM) control signals and synchronous control signals;

wherein during a charging mode, the DBC digital controller operates the second switch to close the first loop and open the third loop, the DBC digital controller applying the PFM control signals to the first bridge transistors and applies the synchronous control signals to the second bridge transistors to operate the DBC as a CLLLC resonant power converter to charge the primary battery on the first DC port from the DC link voltage on the link capacitor;

wherein during a discharging mode, the DBC digital controller operates the second switch to open the first loop and close the third loop, the DBC digital controller applying the PFM control signals to the second bridge transistors and applies the synchronous control signals to the auxiliary transistors to operate the DBC as a phase-shift full bridge of the second bridge transistors with a synchronous rectification by the auxiliary transistors to drive the second DC port from the primary battery on the first DC port.

15. The power hub of claim 14 further comprising:

a third DC port for connecting to an external DC power source;

wherein the external DC power source is an external battery or a solar panel;

a third switch that connects either the AC bi-directional converter or the third DC port to the link capacitor;

wherein when the third switch connects the external DC power source to the link capacitor, the DBC converts power from the external DC power source to charge the primary battery on the first DC port without conversion to AC.

* * * * *